United States Patent
Takao et al.

(10) Patent No.: US 12,347,205 B2
(45) Date of Patent: Jul. 1, 2025

(54) CONTROL METHOD FOR MOBILE OBJECT, MOBILE OBJECT, AND COMPUTER-READABLE STORAGE MEDIUM

(71) Applicant: Mitsubishi Logisnext Co., Ltd., Nagaokakyo (JP)

(72) Inventors: Kenji Takao, Tokyo (JP); Katsumasa Kitajima, Tokyo (JP)

(73) Assignee: MITSUBISHI LOGISNEXT CO., LTD., Nagaokakyo (JP)

( * ) Notice: Subject to any disclaimer, the term of this patent is extended or adjusted under 35 U.S.C. 154(b) by 563 days.

(21) Appl. No.: 17/671,240

(22) Filed: Feb. 14, 2022

(65) Prior Publication Data

US 2022/0262132 A1  Aug. 18, 2022

(30) Foreign Application Priority Data

Feb. 16, 2021  (JP) ................. 2021-022676

(51) Int. Cl.
*G06V 20/58* (2022.01)
*B66F 9/06* (2006.01)
(Continued)

(52) U.S. Cl.
CPC .............. *G06V 20/58* (2022.01); *B66F 9/063* (2013.01); *G05D 1/0225* (2013.01); *G06T 7/70* (2017.01); *G06T 2207/30261* (2013.01)

(58) Field of Classification Search
CPC ....... G06V 20/58; B66F 9/063; B66F 9/0755; G05D 1/0225; G05D 1/0212; G06T 7/70; G06T 2207/30261
See application file for complete search history.

(56) References Cited

U.S. PATENT DOCUMENTS

2015/0347840 A1* 12/2015 Iida ........................... G06T 7/73
                                         382/103
2017/0285644 A1* 10/2017 Ichinose ................ B66F 9/063
(Continued)

FOREIGN PATENT DOCUMENTS

JP       6-229771 A    8/1994
JP    2017-178567 A   10/2017
(Continued)

OTHER PUBLICATIONS

Extended European Search Report for European Application No. 22156047.7, dated Jun. 27, 2022.
(Continued)

*Primary Examiner* — Jonathan L Sample
*Assistant Examiner* — Alan Lindsay Ostrow
(74) *Attorney, Agent, or Firm* — Birch, Stewart, Kolasch & Birch, LLP

(57) ABSTRACT

A control method for a mobile object that automatically moves includes: causing a sensor disposed on the mobile object to detect a target object multiple times to acquire detection results of respective detection processes performed by the sensor as a point group; estimating a position and an attitude of the target object for each detection process based on the point group; calculating reliability of accuracy in an estimation result of the position and the attitude of the target object for each detection process; selecting, from among estimation results of the respective detection processes, an estimation result used for setting an approach path to a target position at which a predetermined position and attitude with respect to the target object are achieved based on the reliability for each detection process; setting the approach path based on the selected estimation result; and causing the mobile object to move along the approach path.

8 Claims, 11 Drawing Sheets

(51) Int. Cl.
   *G05D 1/00*     (2006.01)
   *G06T 7/70*     (2017.01)

(56)          References Cited

U.S. PATENT DOCUMENTS

2018/0292834 A1* 10/2018 Kindo ................ G01C 21/3415
2018/0307241 A1* 10/2018 Holz .................... G05D 1/0244
2019/0194005 A1*  6/2019 Shah ......................... G06T 7/73
2020/0019169 A1*  1/2020 Suvarna ............... G05D 1/0248
2020/0233431 A1   7/2020 Suzuki et al.
2021/0041564 A1*  2/2021 Hattori ................. B66F 9/0755

FOREIGN PATENT DOCUMENTS

JP        2020-70121 A    5/2020
JP       2020-118588 A    8/2020
WO    WO 2013/002067 A1   1/2013

OTHER PUBLICATIONS

Japanese Office Action for Japanese Application No. 2021-022676, dated Dec. 26, 2023, with an English translation.

* cited by examiner

CONTROL METHOD FOR MOBILE OBJECT, MOBILE OBJECT, AND COMPUTER-READABLE STORAGE MEDIUM

CROSS-REFERENCE TO RELATED APPLICATIONS

The present application claims priority to and incorporates by reference the entire contents of Japanese Patent Application No. 2021-022676 filed in Japan on Feb. 16, 2021.

FIELD

The present invention relates to a control method for a mobile object, a mobile object, and a computer-readable storage medium.

BACKGROUND

There has been known a mobile object that includes a sensor for detecting a surrounding state and automatically moves. Examples of such a mobile object include an automatic forklift that conveys a palette on which loads are mounted. Patent Literature 1 discloses a process of specifying a center position and a direction of a front surface of a palette and taking loads from the palette based on distance data measured by a region measuring sensor.

CITATION LIST

Patent Literature

Patent Literature 1: Japanese Patent Application Laid-open No. 2017-178567

SUMMARY

Technical Problem

Such a mobile object is required to be appropriately moved to a target position.

The present disclosure is intended to solve the problem described above, and an object of the present disclosure is to provide a control method for a mobile object, a mobile object, and a computer-readable storage medium that can cause the mobile object to appropriately move to a target position.

Solution to Problem

To solve the above problem and achieve the object, a control method according to the present disclosure is for a mobile object that automatically moves. The control method includes causing a sensor disposed on the mobile object to detect a target object multiple times to acquire detection results of respective detection processes performed by the sensor as a point group; estimating a position and an attitude of the target object for each detection process performed by the sensor based on the point group; calculating reliability of accuracy in an estimation result of the position and the attitude of the target object for each detection process performed by the sensor; selecting, from among estimation results of the respective detection processes performed by the sensor, an estimation result used for setting an approach path to a target position at which a predetermined position and attitude with respect to the target object are achieved, based on the reliability for each detection process performed by the sensor; setting the approach path based on the selected estimation result; and causing the mobile object to move along the approach path.

To solve the above problem and achieve the object, a mobile object according to the present disclosure automatically moves, and includes a detection control unit configured to cause a sensor disposed on the mobile object to detect a target object multiple times to acquire detection results of respective detection processes performed by the sensor as a point group; an approach path information acquisition unit configured to acquire information about an approach path to a target position at which a predetermined position and attitude with respect to the target object are achieved, the target position being set based on the point group; and a movement control unit configured to cause the mobile object to move along the approach path. The approach path is set based on an estimation result selected by: estimating a position and an attitude of the target object for each detection process performed by the sensor based on the point group, calculating reliability of accuracy in an estimation result of the position and the attitude of the target object for each detection process performed by the sensor, and selecting an estimation result used for setting the approach path from among estimation results of the respective detection processes performed by the sensor based on the reliability for each detection process performed by the sensor.

To solve the above problem and achieve the object, a non-transitory computer-readable storage medium according to the present disclosure stores a program for causing a computer to perform a control method for a mobile object that automatically moves. The program includes: causing a sensor disposed on the mobile object to detect a target object multiple times to acquire detection results of respective detection processes performed by the sensor as a point group; estimating a position and an attitude of the target object for each detection process performed by the sensor based on the point group; calculating reliability of accuracy in an estimation result of the position and the attitude of the target object for each detection process performed by the sensor; selecting, from among estimation results of the respective detection processes performed by the sensor, an estimation result used for setting an approach path to a target position at which a predetermined position and attitude with respect to the target object are achieved based on the reliability for each detection process performed by the sensor; setting the approach path based on the selected estimation result; and causing the mobile object to move along the approach path.

Advantageous Effects of Invention

According to the present disclosure, the mobile object can be appropriately moved to the target position.

DESCRIPTION OF EMBODIMENTS

The following describes preferred embodiments of the present invention in detail with reference to the attached drawings. The present invention is not limited to the embodiments. In a case in which there are a plurality of embodiments, the present invention encompasses a combination of the embodiments.

First Embodiment

Figure 1:
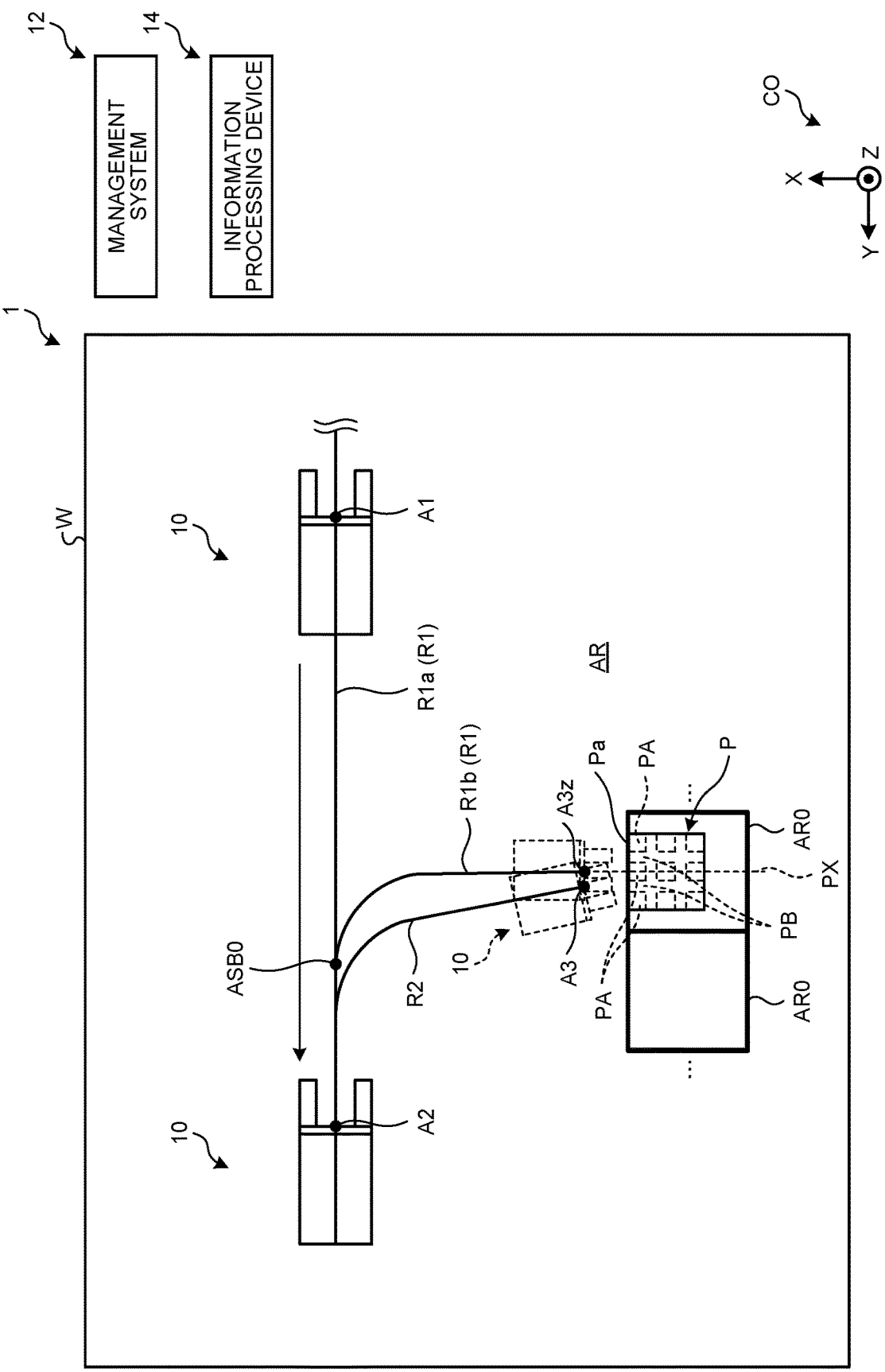
FIG. 1 is a schematic diagram of a movement control system according to a first embodiment.

Entire configuration of movement control system FIG. 1 is a schematic diagram of a movement control system according to a first embodiment. As illustrated in FIG. 1, a movement control system 1 according to the first embodiment includes a mobile object 10, a management system 12, and an information processing device 14. The movement control system 1 is a system that controls movement of the mobile object 10 belonging to a facility W. The facility W is, for example, a facility such as a warehouse in which physical distribution is managed. In the movement control system 1, the mobile object 10 is caused to pick up and convey a target object P disposed in a region AR of the facility W. The region AR is, for example, a floor face of the facility W, which is a region in which the target object P is disposed and the mobile object 10 moves. In the present embodiment, the target object P is an object to be conveyed in which a load is mounted on a palette. In the target object P, a plurality of pillars PA and openings PB formed among the pillars PA are formed on a front surface Pa. The front surface Pa is a surface toward which the mobile object 10 approaches. The mobile object 10 inserts a fork 24 (described later) into an opening PB to hold the target object P. However, the target object P may have an optional form instead of the palette on which the load is mounted. For example, the target object P may be the load alone without the palette. Hereinafter, a direction along the region AR is assumed to be a direction X, and a direction along the region A and intersecting with the direction X is assumed to be a direction Y. In the present embodiment, the direction Y is a direction orthogonal to the direction X. The direction X and the direction Y may also be referred to as horizontal directions. A direction orthogonal to the direction X and the direction Y, that is, a vertical direction is assumed to be a direction Z.

A plurality of disposition regions AR0 are arranged in the region AR within the facility W. Each of the disposition regions AR0 is a region in which the target object P is disposed. The disposition region AR0 is set in advance as a region in which the target object P should be disposed. The disposition region AR0 is partitioned by a white line and the like, for example, and a position (coordinates), a shape, and a size of the disposition region AR0 are set in advance. In the disposition region AR0, the target object P is disposed such that the front surface Pa faces the direction X side. In the example of FIG. 1, the target object P is disposed in the disposition region AR such that an axis PX, which is orthogonal to the front surface Pa when viewed from the direction Z, runs along the direction X, that is, orientation of the target object P is aligned with the disposition region AR0. However, regarding the target object P, the axis PX does not necessarily run along the direction X. The target object P may be disposed such that the axis PX is inclined from the direction X, that is, the orientation of the target object P is misaligned with the disposition region AR. For example, it is preferable that the target object P is disposed in the disposition region AR0 such that an inclination angle between the axis PX and the direction X is equal to or smaller than 45 degrees.

In the present embodiment, the disposition region AR0 is arranged in the region AR that is a floor of the facility W, but the embodiment is not limited thereto. For example, the disposition region AR0 may be arranged in a load-carrying platform of a vehicle that has carried the target object P into the facility W. In the present embodiment, the disposition region AR0 is partitioned for each target object P, and one target object P is disposed in the disposition region AR0. However, the embodiment is not limited thereto. For example, the disposition region AR0 may be set as a free space in which a plurality of the target objects P are disposed. In the example of FIG. 1, the disposition region AR0 has a rectangular shape, but the shape and the size thereof may be optional. The number of the disposition regions AR0 arranged in the region AR may also be optional.

The mobile object 10 is a device that can automatically move. In the present embodiment, the mobile object 10 is a forklift, more specifically, what is called an Automated Guided Forklift (AGF). As exemplified in FIG. 1, the mobile object 10 moves in the region AR in the facility W. While moving from a first position A1 to a second position A2 along a first path R1 (wide area path), the mobile object 10 detects the target object P multiple times with sensors 26 (described later). The mobile object 10 acquires a point group from a plurality of detection results obtained by the sensors 26, and specifies a position and an attitude of the target object P based on the point group. When arriving at the second position A2, the mobile object 10 moves from the second position A2 to a target position A3 along a second path R2 (approach path) that is set based on the position and the attitude of the target object P, and picks up the target object P. Herein, the position of the target object P means coordinates of the target object P in a two-dimensional coordinate system CO in the direction X and the direction Y, and the attitude of the target object P means orientation (rotation angle) of the target object P when viewed from a direction orthogonal to the direction X and the direction Y. The target position A3 is a position and an attitude that are a predetermined position and attitude with respect to the target object P. In the present embodiment, the target position A3 can be assumed to be a position and an attitude at and with which the mobile object 10 can pick up the target object P. For example, the target position A3 may be a position and an attitude of the mobile object 10 at and with which the mobile object 10 can insert the fork 24 of the mobile object 10 (described later) into the opening PB of the target object P by moving straight forward without moving in a lateral direction. In this case, the mobile object 10 moves straight forward from the target position A3 to pick up the target object P, and conveys the target object P to another place. A specific method for specifying the position and the attitude of the target object P, and details about movement along the first path R1 and the second path R2 will be described later. The first path R1 and the second path R2 illustrated in FIG. 1 are merely examples.

Mobile Object

Figure 2:
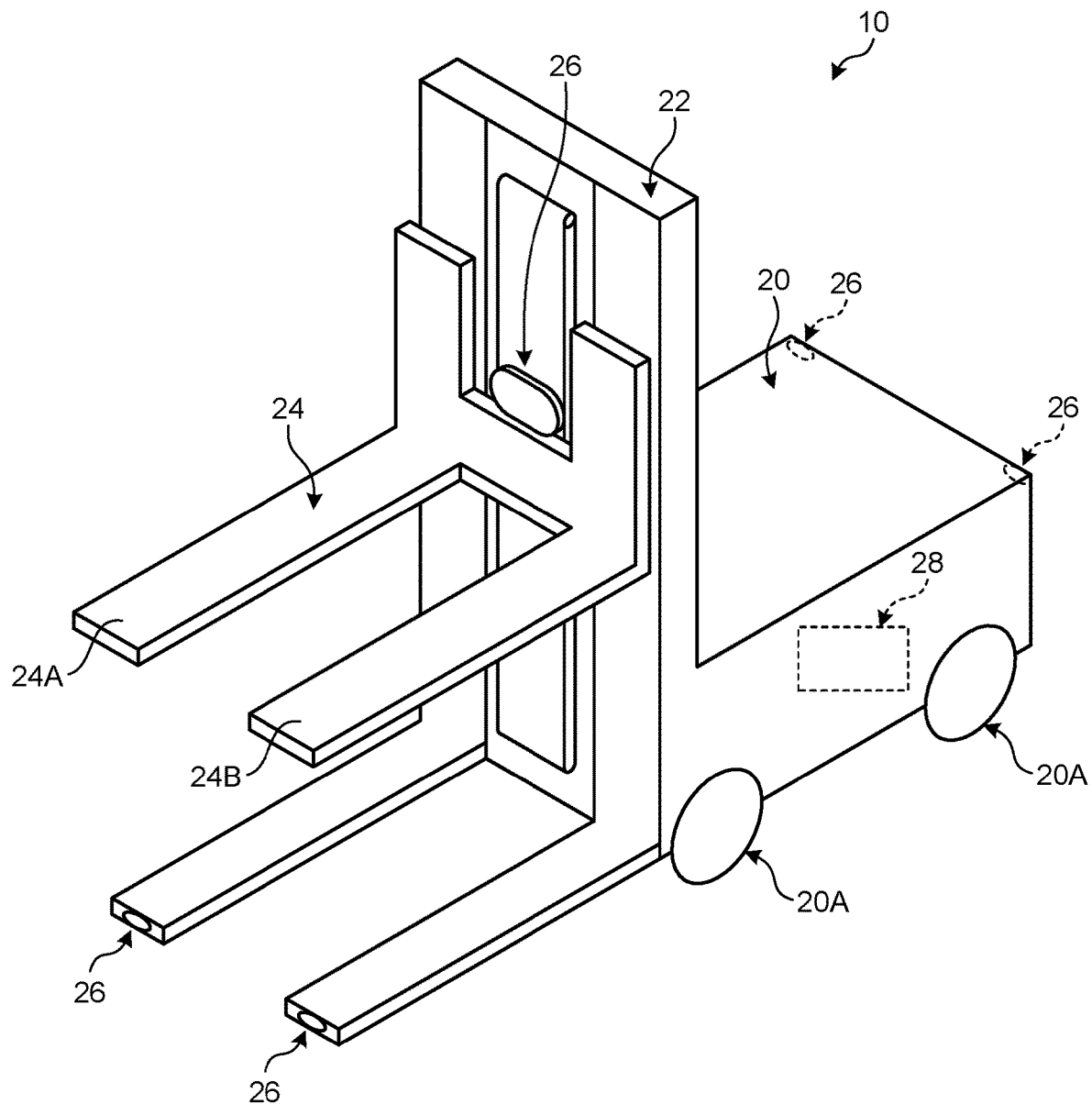
FIG. 2 is a schematic diagram of a configuration of a mobile object.

FIG. 2 is a schematic diagram of a configuration of the mobile object. As illustrated in FIG. 2, the mobile object 10 includes a vehicle body 20, a mast 22, the fork 24, the sensors 26, and a control device 28. The vehicle body 20 includes wheels 20A. The mast 22 is disposed at one end part in a front and rear direction of the vehicle body 20. The mast 22 extends along an upper and lower direction (the direction Z herein) orthogonal to the front and rear direction. The fork 24 is attached to the mast 22 in a manner movable in the direction Z. The fork 24 may also be movable in a lateral direction (a direction intersecting with the upper and lower direction and the front and rear direction) of the vehicle body 20 with respect to the mast 22. The fork 24 includes a pair of hooks 24A and 24B. The hooks 24A and 24B extend toward a front direction of the vehicle body 20 from the mast 22. The hook 24A and the hook 24B are disposed to be separated from each other in a lateral direction of the mast 22. Hereinafter, regarding the front and rear direction, a direction toward a side on which the fork 24 is arranged in the mobile object 10 is assumed to be a front direction, and a direction toward a side on which the fork 24 is not arranged is assumed to be a rear direction.

Each of the sensors 26 detects at least one of a position and an attitude of an object that is present around the vehicle body 20. It can also be said that the sensor 26 detects the position of the object with respect to the mobile object 10, and the attitude of the object with respect to the mobile object 10. In the present embodiment, the sensors 26 are disposed on the mast 22 and four corners of the vehicle body 20, that is, on left and right end parts on a forward side of the vehicle body 20 and left and right end parts on a backward side thereof. However, the positions at which the sensors 26 are disposed are not limited thereto. The sensors 26 may be disposed at optional positions, and the number of the sensors 26 to be disposed may also be optional. For example, a safety sensor installed on the mobile object 10 may also be used as the sensor 26. By using the safety sensor as the sensor 26, another sensor is not required to be installed.

The sensor 26 detects (receives) reflected light from a surrounding object to detect the position and the attitude of the object. Furthermore, the sensor 26 is a sensor that emits light, and more specifically, emits laser light as light. The sensor 26 detects reflected light of the emitted laser light to detect the position and the attitude of the object. The sensor 26 emits laser light while performing scanning in one direction, and detects the position and the attitude of the object from reflected light of the emitted laser light. That is, the sensor 26 can be assumed to be what is called a 2D-Light Detection And Ranging (LiDAR). In the present embodiment, the sensor 26 scans the laser light in a horizontal direction, that is, a direction orthogonal to the direction Z. However, the sensor 26 is not limited thereto, and may be a sensor that detects the object using an optional method. For example, the sensor 26 may be what is called a 3D-LiDAR that scans in a plurality of directions, or may be a camera.

The control device 28 controls movement of the mobile object 10. The control device 28 will be described later.

Management System

Figure 3:
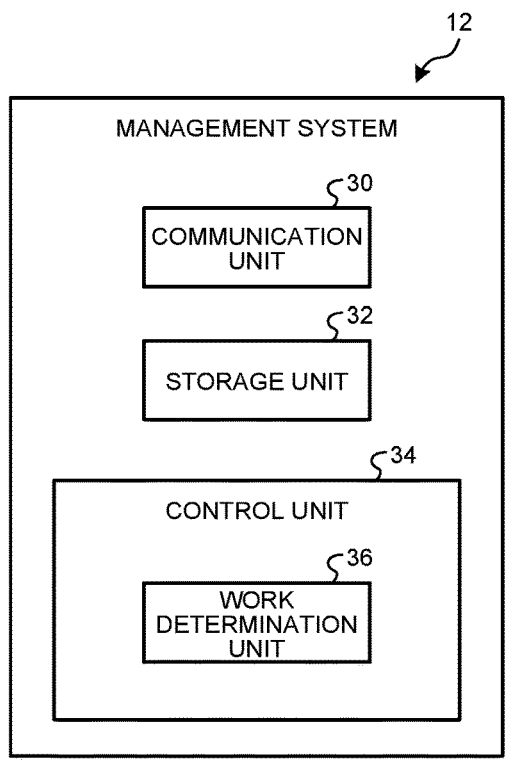
FIG. 3 is a schematic block diagram of a management system.

FIG. 3 is a schematic block diagram of the management system. The management system 12 is a system that manages physical distribution in the facility W. The management system 12 is a Warehouse Management System (WMS) in the present embodiment, but may be an optional system, not limited to the WMS. For example, the management system 12 may be a back-end system such as another production management system. A position at which the management system 12 is disposed is optional. The management system 12 may be disposed in the facility W, or may be disposed at a position remote from the facility W to manage the facility W from the remote position. The management system 12 is a computer, and includes a communication unit 30, a storage unit 32, and a control unit 34 as illustrated in FIG. 3.

The control unit 34 is an arithmetic device, that is, a central processing unit (CPU). The control unit 34 includes a work determination unit 36. The control unit 34 implements the work determination unit 36 by reading out, from the storage unit 32, and executing a computer program (software), and performs processing thereof. The control unit 34 may perform processing by one CPU, or may include a plurality of CPUs and perform processing by the CPUs. The work determination unit 36 may also be implemented by a hardware circuit. A computer program for the control unit 34 stored in the storage unit 32 may be stored in a storage medium that can be read by the management system 12.

The work determination unit 36 determines the target object P to be conveyed. Specifically, the work determination unit 36 determines work content indicating information on the target object P to be conveyed based on an input work plan, for example. It can also be said that the work content is information for specifying the target object P to be conveyed. In the example of the present embodiment, the work content determines which target object P in which facility is conveyed to where by when. That is, the work content is information indicating the facility in which the target object P to be conveyed is stored, the target object P to be conveyed, a conveyance destination of the target object P, and a conveyance timing of the target object P. The work determination unit 36 transmits the determined work content to the information processing device 14 via the communication unit 30.

Information Processing Device

Figure 4:
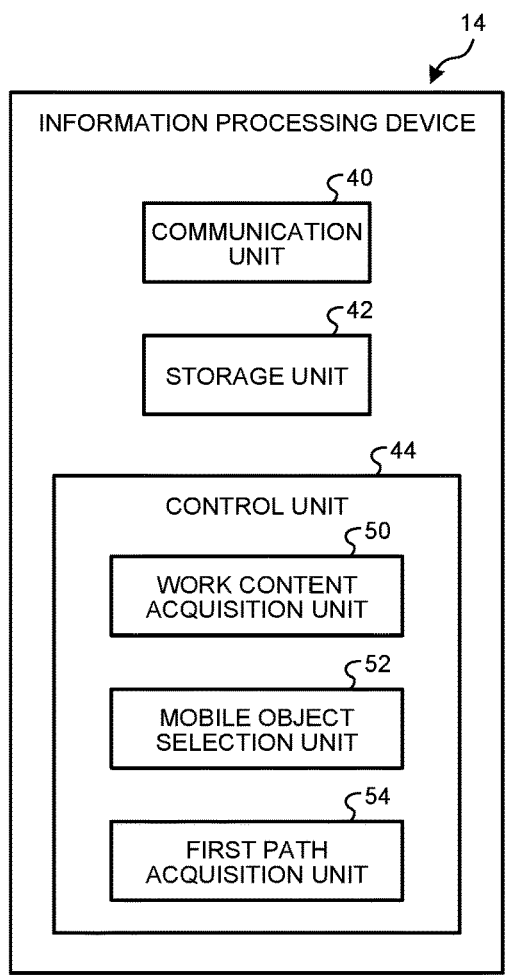
FIG. 4 is a schematic block diagram of an information processing device.

FIG. 4 is a schematic block diagram of the information processing device. The information processing device 14 is a device that is disposed in the facility W and at least transmits/receives information related to movement of the mobile object 10 to/from the mobile object 10, that is, what is called a ground system. The information processing device 14 is a computer, and includes a communication unit 40, a storage unit 42, and a control unit 44 as illustrated in FIG. 4. The communication unit 40 is a module that is used by the control unit 44 to communicate with an external device such as the management system 12 and the mobile object 10, and may include an antenna, for example. A communication scheme used by the communication unit 40 is wireless communication in the present embodiment, but the communication scheme may be optional. The storage unit 42 is a memory that stores various kinds of information such as a computer program or arithmetic content of the control unit 44, and includes at least one of a random access memory (RAM), a main storage device such as a read only memory (ROM), and an external storage device such as a hard disk drive (HDD), for example.

The control unit 44 is an arithmetic device, that is, a CPU. The control unit 44 includes a work content acquisition unit 50, a mobile object selection unit 52, and a first path acquisition unit 54. The control unit 44 implements the work content acquisition unit 50, the mobile object selection unit 52, and the first path acquisition unit 54 by reading out, from the storage unit 42, and executing a computer program (software), and performs processing thereof. The control unit 44 may perform the processing by one CPU, or may include a plurality of CPUs and perform the processing by the CPUs. At least part of the work content acquisition unit 50, the mobile object selection unit 52, and the first path acquisition unit 54 may be implemented by a hardware circuit. A computer program for the control unit 44 stored in the storage unit 42 may be stored in a storage medium that can be read by the information processing device 14.

Work Content Acquisition Unit and Mobile Object Selection Unit

The work content acquisition unit 50 acquires information on the work content determined by the management system 12, that is, information on the target object P to be conveyed. The work content acquisition unit 50 specifies the disposition region AR0 in which the target object P is disposed based on the information on the target object P in the work content. For example, the storage unit 42 stores the target object P and the disposition region AR0 in which the target object P is disposed in association with each other, and the work content acquisition unit 50 specifies the disposition region AR0 by reading out the information from the storage unit 42. The mobile object selection unit 52 selects the mobile object 10 to be operated. For example, the mobile object selection unit 52 selects the mobile object 10 to be operated from among a plurality of the mobile objects belonging to the facility W. The mobile object selection unit 52 may select the mobile object 10 to be operated, using an optional method. For example, based on the disposition region AR0 specified by the work content acquisition unit 50, the mobile object selection unit 52 may select the mobile object 10 suitable for conveyance of the target object P in the disposition region AR0 as the mobile object 10 to be operated.

First Path Acquisition Unit

The first path acquisition unit 54 acquires information about the first path R1 to the disposition region AR0 specified by the work content acquisition unit 50. The first path R1 is set in advance for each of the disposition regions AR0, for example. The first path acquisition unit 54 acquires, from the storage unit 42, for example, the first path R1 that is set for the disposition region AR0 specified by the work content acquisition unit 50. The following specifically describes the first path R1.

As illustrated in FIG. 1, the first path R1 is a track that traverses the disposition region AR0 (target object P) along the direction Y on the direction X side of the disposition region AR0 (target object P) toward which the mobile object 10 moves. More specifically, the first path R1 includes a detection track R1a and an approach track R1b connected to the detection track R1a.

As illustrated in FIG. 1, the detection track R1a is a track that traverses the disposition region AR0 (target object P) along the direction Y on the direction X side of the disposition region AR0 (target object P). The detection track R1a is preferably set such that a distance in the direction X to the disposition region AR0 falls within a range of a predetermined distance. Herein, the predetermined distance is a distance at which the sensor 26 of the mobile object 10 moving on the detection track R1a can detect the position and the attitude of the target object P in the disposition region AR0. More specifically, in the present embodiment, the detection track R1a is a track from the first position A1 to the second position A2. The first position A1 is set as a position on the direction X side of the disposition region AR0, and on a side opposite to the direction Y side of the disposition region AR0. The second position A2 is set as a position on the direction X side of the disposition region AR0, and on the direction Y side of the disposition region AR0. In the present embodiment, the first position A1 and the second position A2 are set such that the distance in the direction X to the disposition region AR0 falls within the range of the predetermined distance, and the positions in the direction X (X-coordinates) of the first position A1 and the second position A2 are identical to each other. The detection track R1a is set as a linear track along the direction Y from the first position A1 to the second position A2. However, the positions in the direction X (X-coordinates) of the first position A1 and the second position A2 are not necessarily identical to each other. The detection track R1a is not limited to the linear track, and may be a track depicting an optional locus from the first position A1 to the second position A2.

As illustrated in FIG. 1, the approach track R1b is a track from the second position A2 toward the disposition region AR0. More specifically, the approach track R1b is a track from the second position A2 to a set position A3z. The set position A3z is a position and an attitude that are a predetermined position and attitude with respect to the target object P assuming that the position and the attitude of the target object P in the disposition region AR0 satisfy a predetermined state (the target object P is ideally disposed without misalignment with the disposition region AR0). That is, the set position A3z is a position and an attitude at and with which the mobile object 10 can pick up the target object P assuming that the position and the attitude of the target object P satisfy the predetermined state, and it can also be said that the set position A3z is the target position A3 in a case in which the position and the attitude of the target object P satisfy the predetermined state. In the example of FIG. 1, the approach track R1b includes a linear track from the second position A2 to an intermediate position ASB0 on a side opposite to the direction Y of the second position A2, and a curved track from the intermediate position ASB0 to the set position A3z. The linear track from the second position A2 to the intermediate position ASB0 preferably overlaps the detection track R1a.

Although not illustrated herein, the first path R1 may also include a track from a movement start position of the mobile object 10 to the first position A1.

However, the first path R1 is not limited to the track as described above. For example, the first path R1 does not necessarily include the approach track R1b. That is, the first path R1 may include at least the detection track R1a from the first position A1 to the second position A2. Furthermore, the first path R1 does not necessarily include a track traversing the disposition region AR0 (target object P) such as the detection track R1a, but may be a track linearly approaching a front surface of the disposition region AR0 (target object P), for example. Additionally, the first path R1 is not limited to a track along which the mobile object 10 moves straight in a rear direction to traverse the disposition region AR0 (target object P), and turns back at the second position A2. The first path R1 may be a track along which the mobile object 10 moves straight in a front direction and turns to approach the front surface of the disposition region AR0 (target object P).

The first path R1 is set in advance based on map information on the facility W. The map information on the facility W is information including positional information on an obstacle (such as a pillar) disposed in the facility W, a passage along which the mobile object 10 can travel, and the like, that is, information indicating a region in which the mobile object 10 can move in the region AR. The first path R1 may be set also based on information about vehicle specifications of the mobile object 10 in addition to the map information on the facility W. The information about the vehicle specifications is, for example, specifications that influence a route along which the mobile object 10 can move, such as a size or a minimum turning radius of the mobile object 10. In a case in which the first path R1 is set also based on the information about the vehicle specifications, the first path R1 may be set for each mobile object. The first path R1 may also be set by a person based on the map information, the information about the vehicle specifications, and the like, or may be automatically set by a device such as the information processing device 14 based on the map information, the information about the vehicle specifications, and the like. In a case of automatically setting the first path R1, for example, a point desired to be passed through (Waypoint) may be designated, for example. In this case, the shortest first path R1 can be set to pass through the point desired to be passed through while avoiding an obstacle (a fixed object such as a wall).

The first path acquisition unit 54 may set the first path R1 by an arithmetic operation without reading out the first path R1 set in advance. In this case, the first path acquisition unit 54 may generate, as the first path R1, a route from a current position of the mobile object 10 to the set position A3z as a movement destination via the first position A1 and the second position A2 based on positional information on the mobile object 10 to be operated, positional information on the disposition region AR0, and the map information on the facility W.

The information processing device 14 transmits the acquired information on the first path R1 to the mobile object 10 to be operated via the communication unit 40. The first path R1 is a route to the disposition region AR0, so that it can be said that the first path R1 is information related to movement of the mobile object 10.

Control Device for Mobile Object

Figure 5:
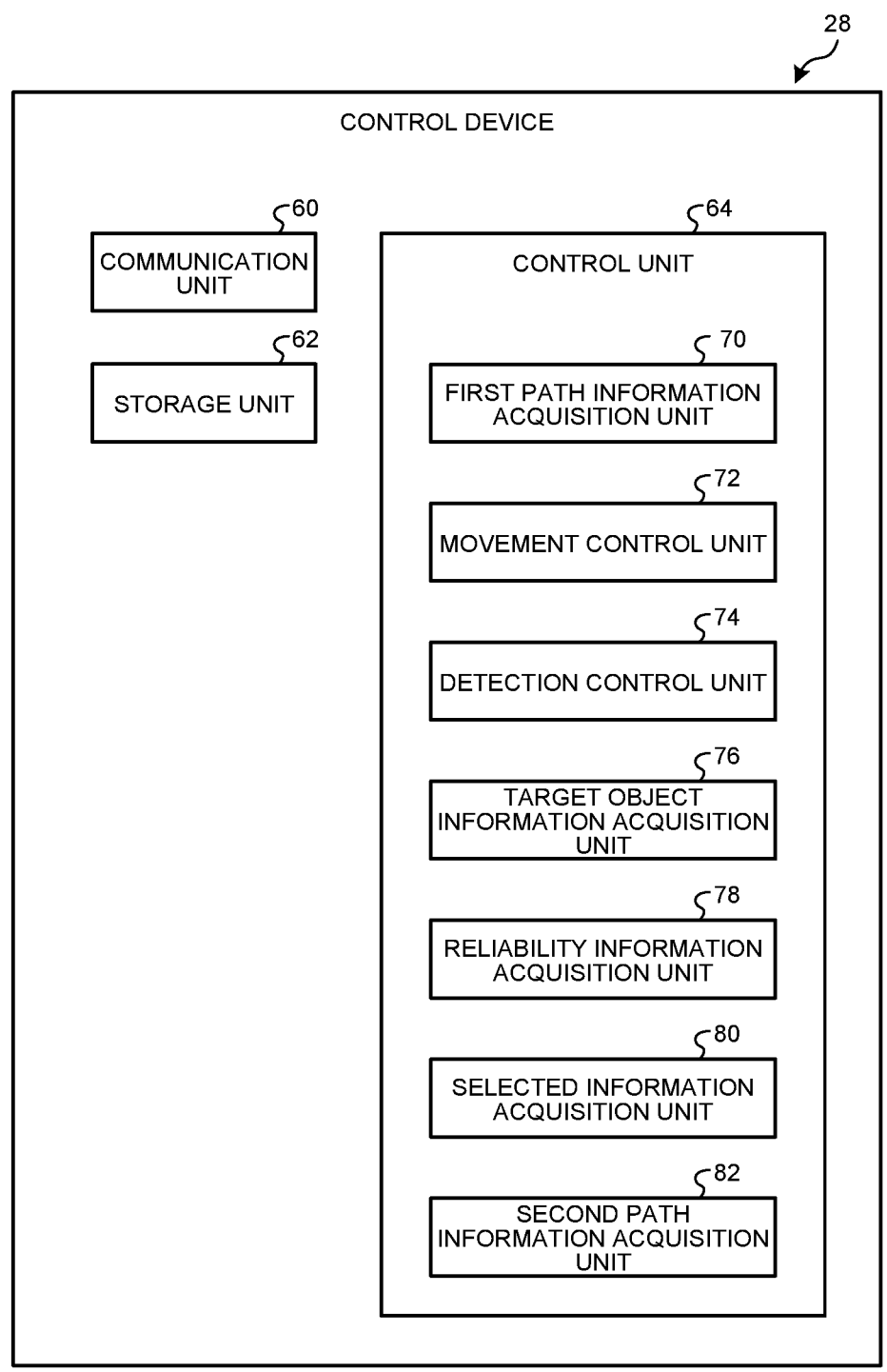
FIG. 5 is a schematic block diagram of a control device for the mobile object.

Next, the following describes the control device 28 for the mobile object 10. FIG. 5 is a schematic block diagram of the control device for the mobile object. The control device 28 controls the mobile object 10. The control device 28 causes the mobile object 10 to move to the target position A3 along the second path R2 that is set based on the detection results obtained by the sensor 26 of the mobile object 10, and causes the mobile object 10 to pick up the target object P. The control device 28 is a computer, and includes a communication unit 60, a storage unit 62, and a control unit 64 as illustrated in FIG. 5. The communication unit 60 is a module that is used by the control unit 64 to communicate with an external device such as the information processing device 14, and may include an antenna and the like, for example. A communication scheme used by the communication unit 40 is wireless communication in the present embodiment, but the communication scheme may be optional. The storage unit 62 is a memory that stores various kinds of information such as a computer program and arithmetic content of the control unit 64, and includes at least one of a RAM, a main storage device such as a ROM, and an external storage device such as an HDD, for example.

The control unit 64 is an arithmetic device, that is, a CPU. The control unit 64 includes a first path information acquisition unit 70, a movement control unit 72, a detection control unit 74, a target object information acquisition unit 76, a reliability information acquisition unit 78, a selected information acquisition unit 80, and a second path information acquisition unit 82. The control unit 64 implements the first path information acquisition unit 70, the movement control unit 72, the detection control unit 74, the target object information acquisition unit 76, the reliability information acquisition unit 78, the selected information acquisition unit 80, and the second path information acquisition unit 82 by reading out, from the storage unit 62, and executing a computer program (software), and performs processing thereof. The control unit 64 may perform the processing by one CPU, or may include a plurality of CPUs and perform the processing by the CPUs. At least part of the first path information acquisition unit 70, the movement control unit 72, the detection control unit 74, the target object information acquisition unit 76, the reliability information acquisition unit 78, the selected information acquisition unit 80, and the second path information acquisition unit 82 may be implemented by a hardware circuit. A computer program for the control unit 64 stored in the storage unit 62 may be stored in a storage medium that can be read by the control device 28.

First Path Information Acquisition Unit

The first path information acquisition unit 70 acquires information about the first path R1. When the mobile object 10 is selected to be operated, the first path information acquisition unit 70 may acquire the information about the first path R1 from the information processing device 14, or may read out the information about the first path R1 previously stored in the storage unit 62.

Movement Control Unit

The movement control unit 72 controls movement of the mobile object 10 by controlling a moving mechanism such as a driving unit or a steering system of the mobile object 10. The movement control unit 72 causes the mobile object 10 to move along the first path R1 acquired by the first path information acquisition unit 70 or the second path R2 acquired by the second path information acquisition unit 82 at a latter stage. By successively grasping the positional information on the mobile object 10, the movement control unit 72 causes the mobile object 10 to move to pass through the first path R1 and the second path R2. A method of acquiring the positional information on the mobile object 10 is optional. For example, in the present embodiment, a detection body (not illustrated) is disposed in the facility W, and the movement control unit 72 acquires information about the position and the attitude of the mobile object 10 based on detection of the detection body. Specifically, the mobile object 10 emits laser light toward the detection body, and receives reflected light of the laser light reflected from the detection body to detect the position and the attitude of the mobile object 10 in the facility W. Herein, the position of the mobile object 10 is coordinates in the two-dimensional coordinate system CO in the direction X and the direction Y in the region A of the facility W, and in the following description, the position means coordinates in the two-dimensional coordinate system CO unless otherwise indicated. The attitude of the mobile object 10 is orientation (rotation angle) of the mobile object 10 when viewed from the direction Z orthogonal to the direction X and the direction Y. A method of acquiring the information about the position and the attitude of the mobile object 10 is not limited to using the detection body. For example, a self-position estimation technique such as Simultaneous Localization and Mapping (SLAM) may be used.

Detection Control Unit

The detection control unit 74 causes the sensor 26 to detect the front surface Pa of the target object P, and acquires the detection results of the sensor 26 as a point group. Specific processing content of the detection control unit 74 will be described later.

Target Object Position Information Acquisition Unit

The target object information acquisition unit 76 acquires an estimation result of the position and the attitude of the target object P that are estimated based on a position of the point group. Specific processing performed by the target object information acquisition unit 76 will be described later.

Reliability Information Acquisition Unit

The reliability information acquisition unit 78 acquires information about reliability of accuracy in the estimation result of the position and the attitude of the target object P. Specific processing performed by the reliability information acquisition unit 78 will be described later.

Selected Information Acquisition Unit

The selected information acquisition unit 80 acquires information about an estimation result that is selected based on the reliability from among a plurality of the estimation results of the position and the attitude of the target object P. Specific processing performed by the selected information acquisition unit 80 will be described later.

Second Path Information Acquisition Unit

The second path information acquisition unit 82 acquires information about the second path R2 to the target position A3 that is set based on the selected estimation result. Specific processing performed by the second path information acquisition unit 82 will be described later.

Processing Performed by Control Device

Next, the following describes processing performed by the control device 28 at the time when the mobile object 10 moves toward the target object P.

Movement Along First Path

The movement control unit 72 of the control device 28 causes the mobile object 10 to move along the first path R1 acquired by the first path information acquisition unit 70. The movement control unit 72 causes the mobile object 10 to move from the current position of the mobile object 10 to the second position A2 via the first position A1 along the first path R1.

Acquisition of Point Group

Figure 6:
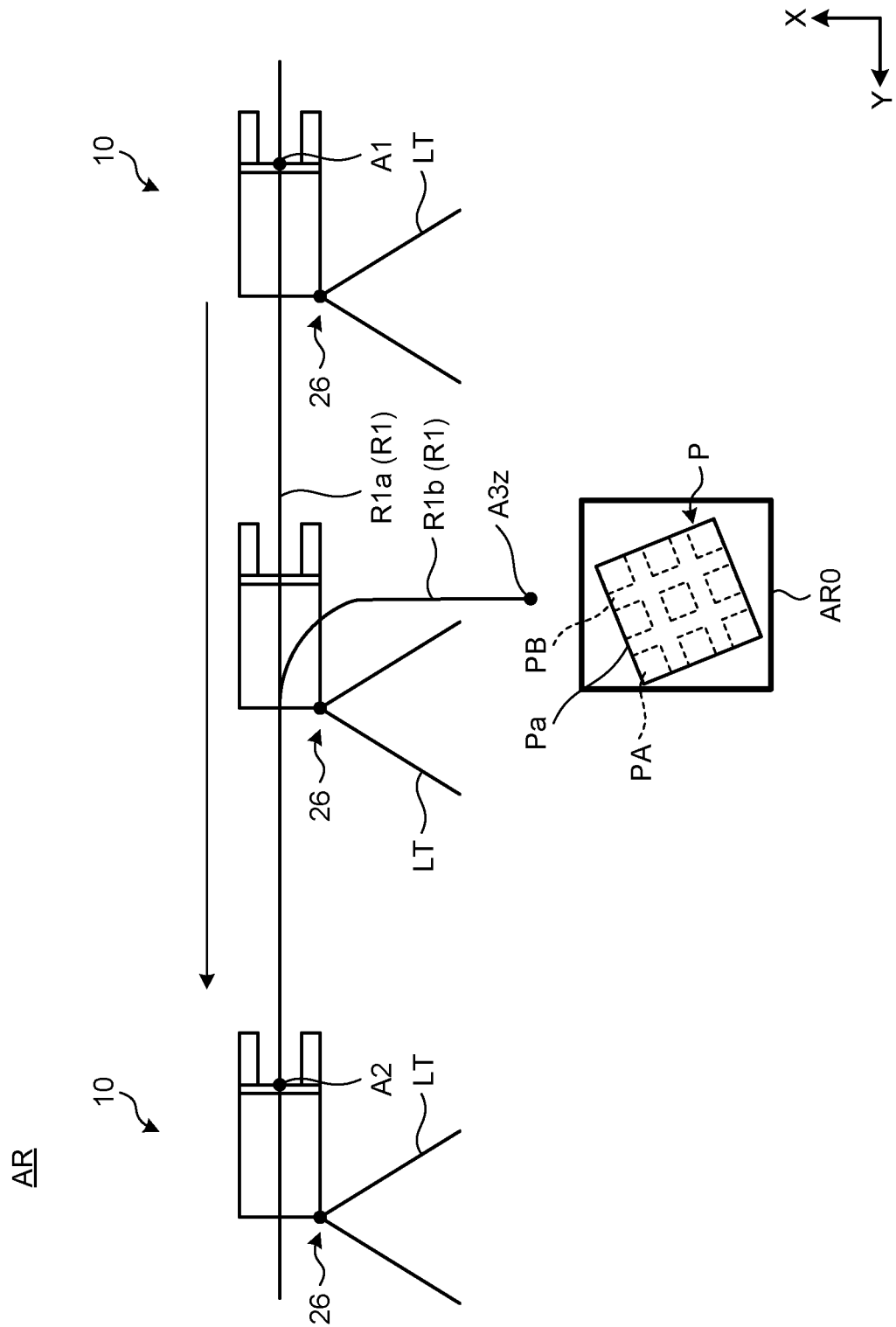
FIG. 6 is a schematic diagram for explaining detection of a target object.

FIG. 6 is a schematic diagram for explaining detection of the target object. As illustrated in FIG. 6, while the mobile object 10 is moving from the first position A1 to the second position A2 along the first path R1, that is, while the mobile object 10 is moving along the detection track R1a, the detection control unit 74 causes the sensor 26 to detect the front surface Pa of the target object P multiple times. The detection control unit 74 causes the sensor 26 to detect the front surface Pa of the target object P by causing the sensor 26 to perform detection toward the disposition region AR0 the position of which is known. Specifically, the detection control unit 74 causes the sensor 26 to emit laser light LT toward the disposition region AR in which the target object P is disposed. The laser light LT is reflected by the front surface Pa of the target object P, and the sensor 26 receives the reflected light from the front surface Pa of the target object P. The detection control unit 74 acquires a point group M0 as a set of measuring points M based on detection results of the reflected light received by the sensor 26. The measuring point M is a point indicating a position (coordinates) at which the laser light LT is reflected, and the point group M0 indicates a set of points indicating positions at which the laser light LT is reflected. In the present embodiment, based on the detection result of the reflected light and the position of the mobile object 10, the detection control unit 74 calculates, as the measuring point M, a position (coordinates) in the two-dimensional coordinate system CO in the direction X and the direction Y of a point at which the reflected light is reflected. However, the detection control unit 74 does not necessarily assume the position in the two-dimensional coordinate system CO as the measuring point M, but may assume a position in a coordinate system based on the sensor 26 or the mobile object 10 as the measuring point M.

Specification of Position and Attitude of Target Object

The target object information acquisition unit 76 estimates the position and the attitude of the target object P based on the measuring points M included in the point group M0 that is acquired by one detection process (one scanning process with the laser light LT) performed by the sensor 26. In the present embodiment, the position and the attitude of the target object P are estimated by detecting an approximate line L for the measuring points M based on the measuring points M acquired by one detection process performed by the sensor 26. The approximate line L corresponds to the front surface Pa of the target object P. That is, for example, inclination of the approximate line L in the two-dimensional coordinate system CO corresponds to the attitude of the target object P, and the position of the approximate line L in the two-dimensional coordinate system CO corresponds to the position of the target object P. The following specifically describes an example of detection processing for the approximate line L.

Acquisition of Candidate for Approximate Line

Figure 7:
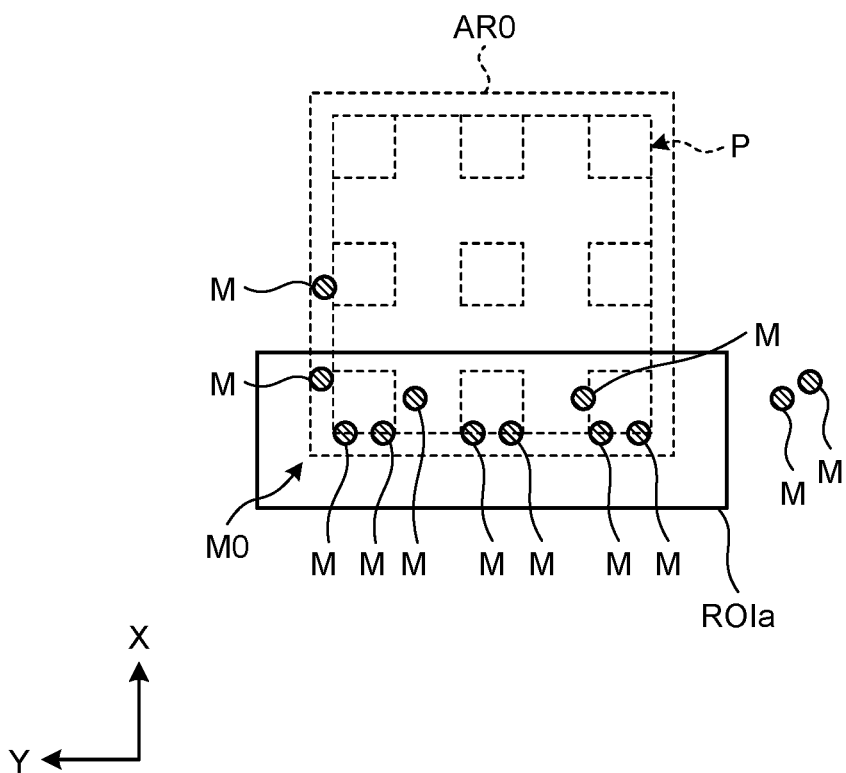
FIG. 7 is a schematic diagram for explaining acquisition of a candidate for an approximate line.

FIG. 7 is a schematic diagram for explaining acquisition of a candidate for the approximate line. As illustrated in FIG. 7, the target object information acquisition unit 76 sets a detection target region ROIa based on the position of the disposition region AR0. The detection target region ROIa is what is called a region of interest (ROI). The target object information acquisition unit 76 specifies a region that is estimated to include the front surface Pa of the target object P based on the position of the disposition region AR0, and sets the region to be the detection target region ROIa. For example, the target object information acquisition unit 76 sets the detection target region ROIa having a width larger than that of the disposition region AR0, and extracts the measuring points M within the detection target region ROIa from among the measuring points M included in the point group M0 acquired by one detection process performed by the sensor 26. The target object information acquisition unit 76 acquires one or more candidates for the approximate line to detect an approximate line L0 corresponding to the front surface Pa of the target object P. For each of the one or more candidates for the approximate line, the target object information acquisition unit 76 gives, to the measuring point M on a near side separated from the candidate for the approximate line by a prescribed distance or larger, a score of a constant having priority for selection lower than that of the other measuring points M. The target object information acquisition unit 76 selects the approximate line L0 corresponding to the front surface Pa of the target object P from among the one or more candidates for the approximate line based on a score integrated value obtained by integrating scores of the measuring points M in the detection target region ROIa. In the present embodiment, the front surface Pa of the target object P has a plane shape, so that the candidate for the approximate line, the approximate line L0, and the approximate line L are detected as straight lines, but they are not limited to straight lines. For example, in a case in which the front surface Pa is known to be a curved surface, the candidate for the approximate line, the approximate line L0, and an approximate line LN may be calculated to be curved lines accordingly.

Figure 8:
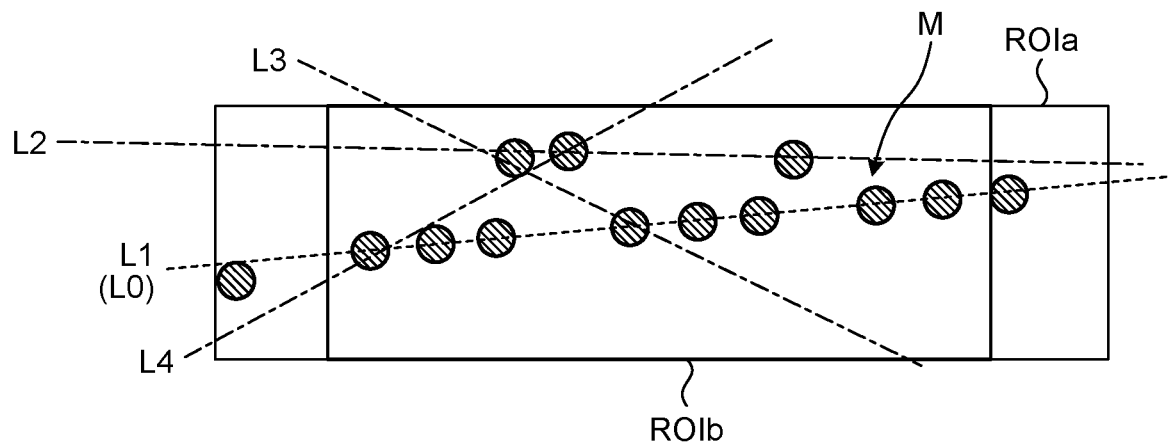
FIG. 8 is a schematic diagram illustrating a specific example of the candidate for the approximate line.

FIG. 8 is a schematic diagram illustrating a specific example of the candidate for the approximate line. For example, as illustrated in FIG. 8, the target object information acquisition unit 76 may further set a detection target region ROIb having a width smaller than that of the detection target region ROIa, and acquire, as the candidate for the approximate line, a straight line connecting two of the measuring points M that are selected from the point group M0 in the detection target region ROIb. FIG. 8 illustrates an example in which the target object information acquisition unit 76 acquires four candidates L1, L2, L3, and L4 for the approximate line based on the point group M0 in the detection target region ROIb. The detection target region ROIb is preferably set to have a width of a size that prevents an adjacent load and the like from entering the detection target region ROIb. The width of the detection target region ROIb may be larger or smaller than that of the disposition region AR0.

The following describes a specific example of a method of acquiring the candidate for the approximate line. The target object information acquisition unit 76 may be configured to acquire, as the candidate for the approximate line, a straight line connecting two of the measuring points M that are selected from the point group M0 in the detection target region using the RANdom SAmple Consensus (RANSAC) algorithm. In this case, the detection target region is the detection target region ROIb. Alternatively, the detection target region may be the detection target region ROIa, or may be a region different from the detection target regions ROIa and ROIb. RANSAC is a method of calculating an evaluation value by randomly selecting two points. The method of acquiring the candidate for the approximate line according to the present disclosure is not limited to the method using RANSAC, but another algorithm such as PROgressive SAmple Consensus (PROSAC) may be used.

The target object information acquisition unit 76 may be configured to acquire, as the candidate for the approximate line, a straight line connecting two of the measuring points M that are respectively selected from point groups M0 on the right side and the left side of a center in a width direction of the detection target region. In this case, the number of combinations is limited, so that all combinations of two points may be assumed to be candidates for the approximate line.

Detection of Approximate Line L0

The target object information acquisition unit 76 calculates the score integrated value for each of the one or more candidates for the approximate line, and detects the approximate line L0 corresponding to the front surface Pa of the target object P based on the score integrated value. The target object information acquisition unit 76 may select (that is, detect), as the approximate line L0, the candidate for the approximate line having high priority indicated by the score integrated value while including the point group M0 outside the detection target region ROIb and inside the detection target region ROIa, and may subject the point group M0 to succeeding processing. In the following description, by way of example, the target object information acquisition unit 76 is assumed to select a candidate L1 for the approximate line illustrated in FIG. 8 as the approximate line L0 based on the score integrated value.

The following describes the score integrated value. For example, in a case of preferentially selecting the candidate for the approximate line having a high score integrated value as a straight line to be used for detecting a line segment, a "score of a constant having low priority" means a score having a value that reduces the score integrated value. On the other hand, for example, in a case of preferentially selecting the candidate for the approximate line having a low score integrated value, the "score of a constant having low priority" means a score having a value that increases the score integrated value.

In calculating the score integrated value, the target object information acquisition unit 76 uses a vertical distance between each of the measuring points M constituting the point group M0 and the candidate for the approximate line. Specifically, the target object information acquisition unit 76 gives, to the measuring point M having a distance smaller than the prescribed distance from the candidate for the approximate line, a score having higher priority than that of the measuring point M on the near side (a side closer to the position of the mobile object 10 at the time of detection) having a distance equal to or larger than the prescribed distance from the candidate for the approximate line, the score having higher priority for the measuring point M closer to the candidate for the approximate line. For example, the target object information acquisition unit 76 gives a score of a negative constant to the measuring point M on the near side having the prescribed distance or larger, and gives a positive score to the measuring point M having a distance smaller than the prescribed distance. A value of the positive score is a variable depending on a distance from the candidate for the approximate line.

Figure 9:
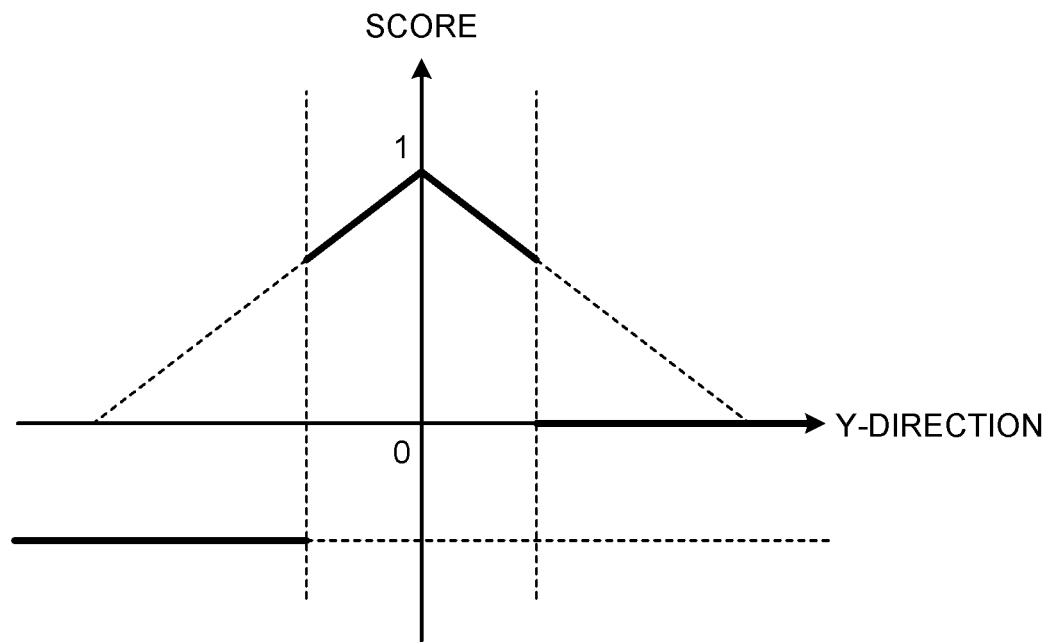
FIG. 9 is a graph illustrating an example of a score.

FIG. 9 is a graph illustrating an example of the score. A horizontal axis of this graph corresponds to the Y-direction (depth), indicates a distance between the measuring point M and the candidate for the approximate line, and means that, toward the right side along the horizontal axis direction, the measuring point M is on a farther side (a side distant from the position of the mobile object 10 at the time of detection). The position at which the depth is zero is a position of the candidate for the approximate line. A vertical axis indicates a value of the score to be given. In the example illustrated in FIG. 9, the score of a negative constant is given to the measuring point M on the near side having a distance equal to or larger than the prescribed distance from the candidate for the approximate line. In this way, a certain penalty is imposed on the measuring point M on the near side having a distance equal to or larger than the prescribed distance from the candidate for the approximate line irrespective of a distance between the candidate for the approximate line and the measuring point M. A larger positive score is given to the measuring point M having a distance smaller than the prescribed distance from the candidate for the approximate line as the measuring point M is closer to the candidate for the approximate line.

In calculating the score integrated value, the target object information acquisition unit 76 excludes the measuring points M on the far side having a distance equal to or larger than the prescribed distance from the candidate for the approximate line from integration of the score integrated value. "Exclude the measuring points M from integration of the score integrated value" means to substantially exclude the measuring points M from the integration of the score integrated value. A score of zero may be given to the measuring points M, or no score may be given to the measuring points M. In the example illustrated in FIG. 9, the score of zero is given to the measuring points M on the far side having a distance equal to or larger than the prescribed distance from the candidate for the approximate line. When such a calculation method for the score integrated value is employed, in the example illustrated in FIG. 8, the candidate L1 for the approximate line is selected as the approximate line L0. The target object information acquisition unit 76 may detect a plurality of approximate lines having high priority indicated by the score integrated value.

Specification of Both Endpoints

The target object information acquisition unit 76 specifies positions of both endpoints in the width direction of the target object P, and detects a line segment partitioned at both endpoints of the approximate line L0 as the approximate line L. Specifically, the target object information acquisition unit 76 extracts one or more line segments from the approximate line L0, and searches the extracted one or more line segments for one line segment or a combination of two or more line segments having a length between both ends corresponding to a length between both ends of the target object P determined from design information. "Corresponding length" means a length within a range of permissible error. The design information on the target object P is information indicating dimensions of the target object P (for example, the length between both ends, positions of and intervals between the openings PB, and the like), and is read out from the storage unit 62 of the control device 28, for example. The target object information acquisition unit 76 specifies both ends of a found line segment or a combination of two or more line segments as both endpoints in the width direction of the target object P. Both endpoints of the target object P indicate an endpoint on one side and an endpoint on the other side in the width direction of the front surface Pa of the target object P.

Figure 10:
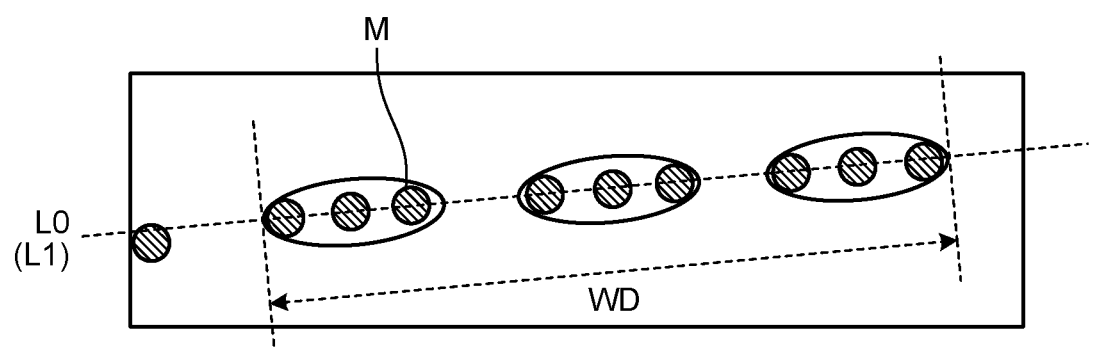
FIG. 10 is a schematic diagram for explaining an example of specification processing for both endpoints of the target object.

FIG. 10 is a schematic diagram for explaining an example of specification processing for both endpoints of the target object. As illustrated in FIG. 10, for example, the target object information acquisition unit 76 extracts three line segments (circled measuring points M) from the selected approximate line L0, and searches for one line segment or a combination of two or more line segments having a length WD between both ends corresponding to a length between both endpoints of the target object P. In the example illustrated in FIG. 10, a length between both ends of a combination of three line segments is detected as a result of searching.

Detection of Approximate Line L

After specifying the positions of both endpoints of the target object P, the target object information acquisition unit 76 calculates the approximate line L by performing straight line fitting on each of the measuring points M by the method of least squares. Specifically, the target object information acquisition unit 76 calculates the approximate line L based on the line segment obtained by detecting both ends of the target object P. The target object information acquisition unit 76 calculates the approximate line L by excluding the measuring point M at a position estimated to be the position of the opening PB of the target object P from the measuring points M (measuring points M acquired by one detection process performed by the sensor 26), further excluding the measuring point M at a position having a distance equal to or larger than the predetermined distance from both ends of the line segment, and performing straight line fitting by the method of least squares using only the rest of the measuring points M. The position of the opening PB of the target object P is estimated based on both detected endpoints of the target object P and the design information on the target object P.

Estimation of Position and Attitude of Target Object Based on Approximate Line L The target object information acquisition unit 76 estimates the position and the attitude of the target object P based on the approximate line L. The target object information acquisition unit 76 estimates the attitude of the target object P from inclination of the approximate line L, and estimates the position of the target object P based on a reference position on the approximate line L (for example, a middle point of the approximate line L).

A method of detecting the approximate line L is not limited to the method described above. The approximate line L may be detected based on the acquired measuring points M using an optional method. For example, the target object information acquisition unit 76 may calculate the approximate line L by performing straight line fitting on all of the measuring points M acquired by one detection process by the method of least squares without performing specification processing for both endpoints, or the like. A method of estimating the position and the attitude of the target object P is not limited to the method of using the approximate line L. The position and the attitude of the target object P may be estimated by an optional method using the acquired measuring points M.

Multiple Times of Detection

The detection control unit 74 causes the sensor 26 to detect the front surface Pa of the target object P multiple times while the mobile object 10 is moving along the first path R1 (detection track R1a). In other words, the detection control unit 74 causes the sensor 26 to scan the front surface Pa of the target object P with the laser light LT multiple times while the mobile object 10 is moving along the first path R1 (detection track R1a). The detection control unit 74 acquires, as the point group M0, detection results of respective detection processes performed by the sensor 26. The target object information acquisition unit 76 estimates the position and the attitude of the target object P for each detection result obtained by the sensor 26 (every time the sensor 26 performs detection). That is, the target object information acquisition unit 76 acquires the estimation result of the position and the attitude of the target object P per detection process performed by the sensor 26.

In this way, in the present embodiment, the sensor 26 is caused to perform detection multiple times while the mobile object 10 is moving along the first path R1. That is, the detection control unit 74 causes the sensor 26 to perform detection for each position of the mobile object 10 on the first path R1, so that positions of the mobile object 10 at the time when the respective detection results are acquired are different from each other. However, a timing for causing the sensor 26 to perform detection is not limited to a timing when the mobile object 10 is moving along the first path R1. For example, the sensor 26 may be caused to perform detection in a state in which the mobile object 10 is stopped. The detection control unit 74 does not necessarily cause one sensor 26 to perform detection multiple times, but may cause a plurality of the sensors 26 to perform detection multiple times by causing the sensors 26 to detect the same target object P.

Calculation of Reliability

The reliability information acquisition unit 78 calculates reliability of estimation accuracy in the estimation result of the position and the attitude of the target object P estimated by the target object information acquisition unit 76. That is, the reliability is an indicator indicating a degree of estimation accuracy for the position and the attitude of the target object P, and in the present embodiment, it can be said that the estimation accuracy for the position and the attitude of the target object P is higher as the reliability is higher. The reliability information acquisition unit 78 calculates the reliability for each estimation result, that is, per detection process performed by the sensor 26 (one scanning process). The following describes a calculation method for the reliability.

Calculation of Number of Ideal Measuring Points

Figure 11:
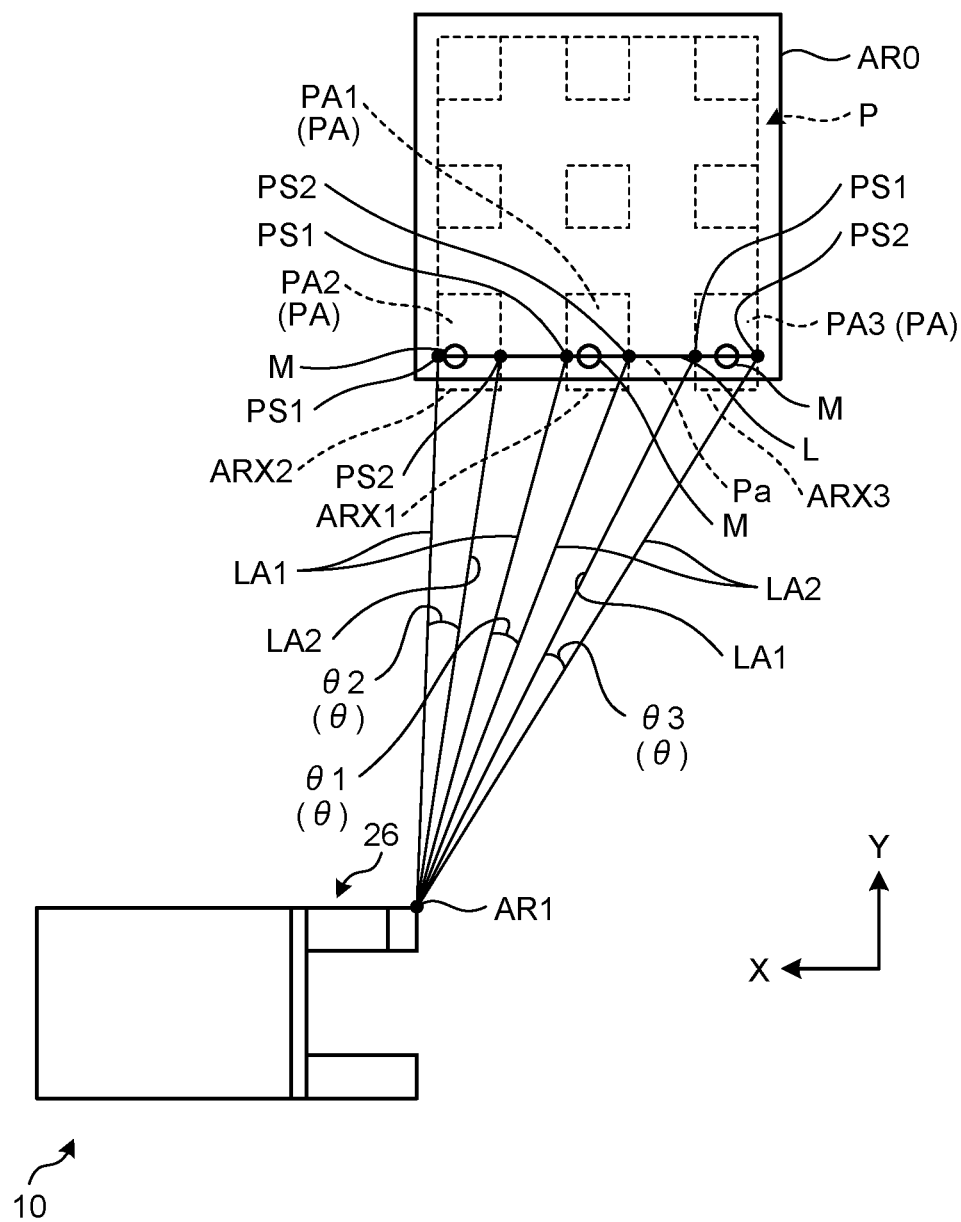
FIG. 11 is a schematic diagram for explaining a calculation method for reliability.

FIG. 11 is a schematic diagram for explaining a calculation method for the reliability. The reliability information acquisition unit 78 calculates the reliability of the estimation result of the position and the attitude of the target object P estimated from the detection result obtained by the sensor 26 based on a ratio between the number of ideal measuring points M (the number of ideal point groups) assumed to be acquired by one detection process performed by the sensor 26 and the number of the actual measuring points M (the number of the measuring points M (point groups) obtained by measuring the front surface Pa of the target object P) acquired by one detection process performed by the sensor 26. The number of the ideal measuring points M is the number of the measuring points M assumed to be observed on the front surface Pa of the target object P by one detection process performed by the sensor 26 in an ideal environment in which influence of a measurement error and the like are not required to be considered. The reliability information acquisition unit 78 calculates the number of the ideal measuring points M based on the estimation result of the position and the attitude of the target object P, the position of the mobile object 10 at the time of performing detection, and performance of the sensor 26 that has performed detection. The performance of the sensor 26 means, for example, at least one of angular resolution of the sensor 26, a measuring speed (period) of the sensor 26, and the number of measuring points of the sensor 26. The angular resolution indicates an angle at which two separate subject points can be detected. The position of the mobile object 10 herein may be a position serving as a reference for the mobile object 10, or may be a position of the sensor 26 that has performed detection. In a case of using, as the position of the mobile object 10, the position of the sensor 26 that has performed detection, the reliability information acquisition unit 78 may specify the position of the mobile object 10 based on the position of the mobile object 10 at the time of performing detection and the position of the sensor 26 with respect to the mobile object 10. The position of the sensor 26 with respect to the mobile object 10 may be acquired in advance as design information, for example.

An angle for scanning the laser light LT by the sensor 26 in one detection process is assumed to be a scan angle. In the present embodiment, in a case of causing the sensor 26 to perform detection from a reference position AR1 based on the estimation result of the position and the attitude of the target object P and the position of the mobile object 10 at the time of performing detection, the reliability information acquisition unit 78 calculates, as a detection angle θ, an angle range in which the laser light LT is emitted to the front surface Pa of the target object P among scan angles. That is, the reliability information acquisition unit 78 excludes an angle range including the laser light LT emitted to a position other than the front surface Pa of the target object P, and extracts an angle range including the laser light LT emitted to the front surface Pa of the target object P to be the detection angle θ. For example, the reliability information acquisition unit 78 calculates the detection angle θ based on an angle formed by a straight line connecting the reference position AR1 with a point on the front surface Pa specified from the estimation result of the position and the attitude of the target object P and a straight line connecting the reference position AR1 with another point on the front surface Pa specified from the estimation result of the position and the attitude of the target object P. The reference position AR1 is a position corresponding to the position of the mobile object 10 at the time of performing detection, and is the position of the mobile object 10 itself at the time of performing detection in the present embodiment.

More specifically, the reliability information acquisition unit 78 calculates the detection angle θ for each pillar PA. As illustrated in FIG. 11, the reliability information acquisition unit 78 acquires positions of both endpoints of the pillar PA based on the estimation result of the position and the attitude of the target object P (approximate line L), and calculates, as the detection angle θ for the pillar PA, an angle formed by a straight line LA1 connecting the reference position AR1 with one endpoint PS1 of the pillar PA and a straight line LA2 connecting the reference position AR1 with the other endpoint PS2 of the pillar PA. In the example of FIG. 11, the reliability information acquisition unit 78 calculates a detection angle θ1 for the pillar PA1, a detection angle θ2 for the pillar PA2, and a detection angle θ3 for the pillar PA3.

The reliability information acquisition unit 78 calculates the number of the ideal measuring points M from a ratio between the calculated detection angle θ and the angular resolution of the sensor 26. More specifically, the reliability information acquisition unit 78 calculates, as the number of the ideal measuring points M, a value obtained by dividing the detection angle θ by the angular resolution. In the present embodiment, the reliability information acquisition unit 78 calculates the number of the ideal measuring points M for each pillar PA. In the example of FIG. 11, the reliability information acquisition unit 78 calculates a value obtained by dividing the detection angle θ1 for the pillar PA1 by the angular resolution as the number of the ideal measuring points M for the pillar PA1 (number NM1 of ideal measuring points), calculates a value obtained by dividing the detection angle θ2 for the pillar PA2 by the angular resolution as the number of the ideal measuring points M for the pillar PA2 (number NM2 of ideal measuring points), and calculates a value obtained by dividing the detection angle θ3 for the pillar PA3 by the angular resolution as the number of the ideal measuring points M for the pillar PA3 (number NM3 of ideal measuring points).

Calculation of Number of Actual Measuring Points

The reliability information acquisition unit 78 calculates the number of the actual measuring points M. The number of the actual measuring points M indicates the number of the measuring points M obtained by measuring the front surface Pa of the target object P among the measuring points M acquired by one detection process performed by the sensor 26. For example, the reliability information acquisition unit 78 extracts, as the actual measuring points M, the measuring points M within a predetermined distance range from the front surface Pa of the target object P (herein, the approximate line L) specified from the estimation result of the position and the attitude of the target object P among the measuring points M acquired by one detection process performed by the sensor 26, and counts the number of the actual measuring points M. For example, the reliability information acquisition unit 78 may set the measuring points M used for detecting the approximate line L to be the actual measuring points M.

More specifically, the reliability information acquisition unit 78 calculates the number of the actual measuring points M for each pillar PA. The reliability information acquisition unit 78 extracts, as the actual measuring points M used for measuring the pillar PA, the measuring points M within a predetermined distance range from the estimated position of the pillar PA (the position of the pillar PA specified from the estimation result of the position and the attitude of the target object P) from among the measuring points M acquired by one detection process performed by the sensor 26, and counts the number of the actual measuring points M. In the example of FIG. 11, the reliability information acquisition unit 78 calculates, as the number of the actual measuring points M (number nm1 of the actual measuring points) used for measuring the pillar PA1, the number of the measuring points M within a region ARX1 having a predetermined area on the near side of the estimated position of the pillar PA1. Similarly, the reliability information acquisition unit 78 calculates, as the number of the actual measuring points M (number nm2 of the actual measuring points) used for measuring the pillar PA2, the number of the measuring points M within a region ARX2 having a predetermined area on the near side of the estimated position of the pillar PA2. Similarly, the reliability information acquisition unit 78 calculates, as the number of the actual measuring points M (number nm3 of the actual measuring points) used for measuring the pillar PA3, the number of the measuring points M within a region ARX3 having a predetermined area on the near side of the estimated position of the pillar PA3.

Calculation of Reliability Based on Number of Ideal Measuring Points and Number of Actual Measuring Points The reliability information acquisition unit 78 calculates reliability of the estimation result of the position and the attitude of the target object P based on a comparison result between the number of the ideal measuring points M and the number of the actual measuring points M. In the present embodiment, the reliability information acquisition unit 78 calculates the reliability based on a ratio of the number of the actual measuring points M to the number of the ideal measuring points M. The reliability information acquisition unit 78 calculates the reliability so that the reliability is higher as a difference between the number of the ideal measuring points M and the number of the actual measuring points M is smaller.

In the present embodiment, the reliability information acquisition unit 78 calculates the reliability for each pillar PA. The reliability information acquisition unit 78 calculates, as the reliability of the estimation result for the pillar PA, a ratio of the number of the actual measuring points M for the pillar PA to the number of the ideal measuring points M for the pillar PA. The reliability information acquisition unit 78 then calculates the reliability of the estimation result of the position and the attitude of the target object P estimated by one detection process performed by the sensor 26 based on the reliability for each pillar PA. In the present embodiment, the reliability information acquisition unit 78 sets a minimum value of the reliability for the respective pillars PA to be the reliability of the estimation result of the position and the attitude of the target object P. That is, in the example of FIG. 11, assuming that the reliability of the estimation result of the position and the attitude of the target object P obtained by one detection process is S, reliability S is calculated by using the following Equation (1).

$$S = \min(nm1/NM1,\ nm2/NM2,\ nm3/NM3) \quad (1)$$

The reliability information acquisition unit 78 calculates the reliability S for each estimation result of the position and the attitude of the target object P, that is, per detection process performed by the sensor 26 (one scanning process) using the same method.

Another Example of Calculation of Reliability

The reliability information acquisition unit 78 calculates the reliability using the method described above, but the calculation method for the reliability is not limited to the method described above. An optional method may be used as the calculation method for the reliability. For example, in the above description, the reliability information acquisition unit 78 calculates the reliability of the measuring point M for each pillar PA, and calculates the reliability of the estimation result obtained by one detection process based on the reliability for each pillar PA, but the embodiment is not limited thereto. In this case, for example, the reliability information acquisition unit 78 calculates the number of the ideal measuring points M for each pillar PA using the same method as described above, and adds up calculation results to calculate a total value of the number of the ideal measuring points for all of the pillars PA. The reliability information acquisition unit 78 then calculates the number of the actual measuring points M for each pillar PA using the same method as described above, and adds up calculation results to calculate a total value of the number of the actual measuring points M. The reliability information acquisition unit 78 may calculate, as the reliability of the estimation result obtained by one detection process, a ratio of the total value of the number of the actual measuring points M to the total value of the number of the ideal measuring points M.

Selection of Estimation Result

The selected information acquisition unit 80 selects an estimation result used for setting of the second path R2 from among estimation results for respective detection processes performed by the sensor 26 based on the reliability of the estimation result obtained by each detection process performed by the sensor 26, the reliability calculated by the reliability information acquisition unit 78. Specifically, the selected information acquisition unit 80 selects the estimation result having high reliability as the estimation result used for setting of the second path R2. That is, for example, the measuring points M acquired by a first detection process performed by the sensor 26 are assumed to be first measuring points (first point group), and the measuring points M acquired by a second detection process different from the first detection process performed by the sensor 26 are assumed to be second measuring points (second point group). In this case, the target object information acquisition unit 76 estimates the position and the attitude of the target object based on the first measuring points, and the reliability information acquisition unit 78 calculates the reliability of the estimation result (estimation result based on the first measuring points). Similarly, the target object information acquisition unit 76 estimates the position and the attitude of the target object that are estimated based on the second measuring points, and the reliability information acquisition unit 78 calculates the reliability of the estimation result (estimation result based on the second measuring points). In this case, the selected information acquisition unit 80 selects, as the estimation result used for setting of the second path R2, the estimation result having higher reliability from the estimation result based on the first measuring points and the estimation result based on the second measuring points.

Furthermore, the selected information acquisition unit 80 selects, as the estimation result used for setting of the second path R2, the estimation result having the highest reliability from the estimation results. However, the method of selecting the estimation result is not limited to the method described above. The estimation result may be selected by using an optional method based on the reliability of each of the estimation results.

Setting of Second Path

Figure 12:
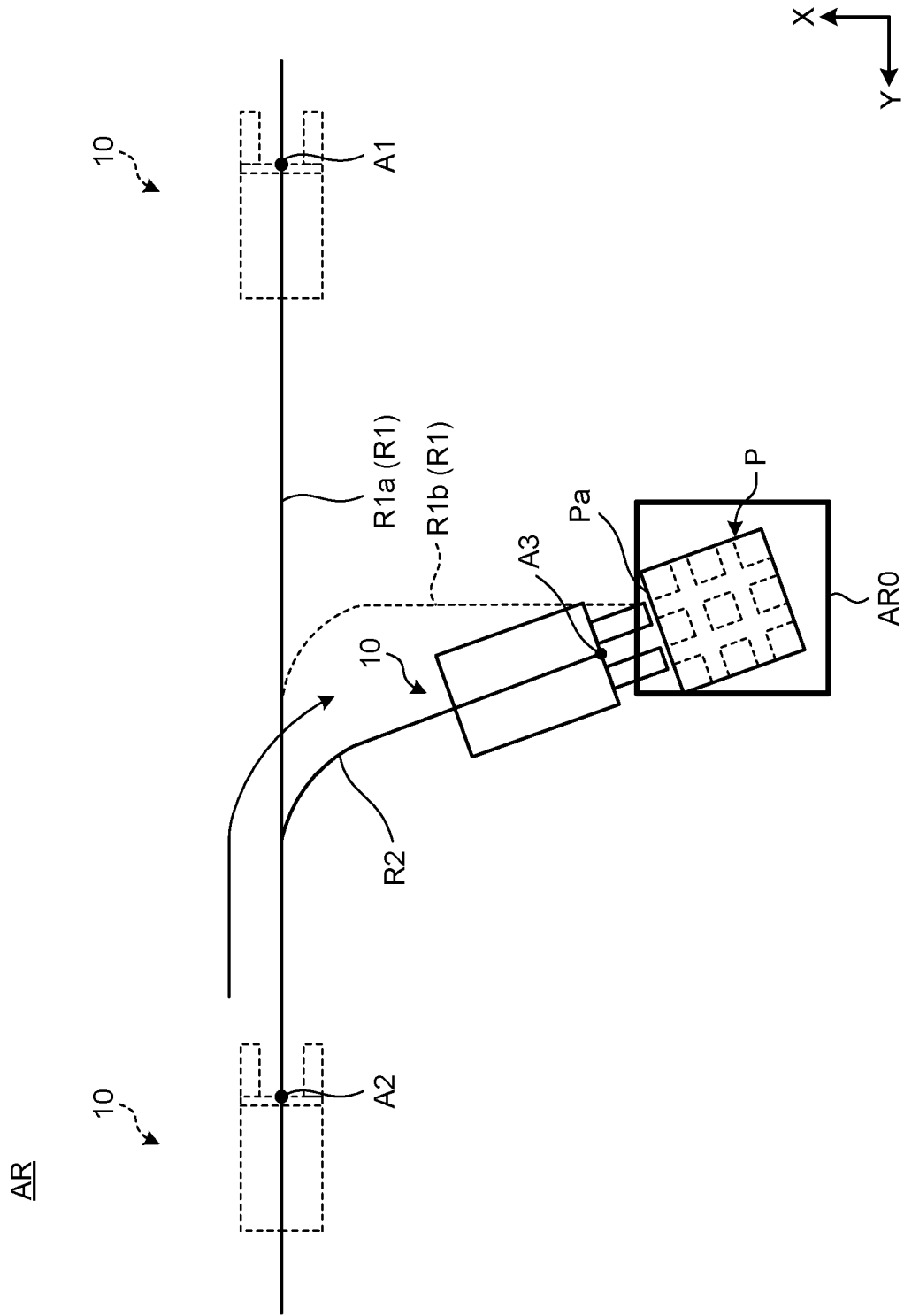
FIG. 12 is a schematic diagram illustrating an example of movement along a second path.

FIG. 12 is a schematic diagram illustrating an example of movement along the second path. The second path information acquisition unit 82 sets the target position A3 based on the estimation result of the position and the attitude of the target object P selected by the selected information acquisition unit 80. For example, the second path information acquisition unit 82 calculates the position and the attitude at and with which the target object P can be picked up (the fork 24 can be inserted into the opening PB of the target object P by straight movement) based on the estimation result of the position and the attitude of the target object P selected by the selected information acquisition unit 80, and sets the position and the attitude as the target position A3. By way of example, a point translated from an entrance of the opening PB by 1000 mm in an axis direction of the opening PB of the target object P may be assumed to be the target position A3. As illustrated in FIG. 12, the second path information acquisition unit 82 sets, as the second path R2, a track from the second position A2 being a starting position to the set target position A3. The second path information acquisition unit 82 may set the second path R2 using an optional method based on the information on the target position A3, and may also calculate the second path R2 by Model Predictive Control (MPC), for example.

Movement Along Second Path

The movement control unit 72 causes the mobile object 10 to move from the second position A2 to the target position A3 along the second path R2. When the mobile object 10 arrives at the target position A3, the movement control unit 72 causes the mobile object 10 to move straight forward from the target position A3, and causes the fork 24 to be inserted into the opening PB of the target object P to pick up the target object P. The movement control unit 72 causes the mobile object 10 that has picked up the target object P to convey the target object P to a set conveyance destination.

In this way, the movement control unit 72 causes the mobile object 10 to move from the second position A2 to the target position A3 along the second path R2, but the embodiment is not limited thereto. For example, the movement control unit 72 may switch between movement along the second path R2 and movement by direct feedback control to cause the mobile object 10 to move to the target position A3. Examples of control by direct feedback include control using a visual servoing scheme as disclosed in "Ozato Atsushi, Maru Noriaki "Position and Orientation Control of Omnidirectional Mobile Robot by Linear Visual Servoing", Transactions of the Japan society of mechanical engineers (Series C), Volume 77, Issue 774, p. 215-224, Feb. 25, 2011". For example, when the mobile object 10 arrives at the target position A3 along the second path R2, the movement control unit 72 may switch control to direct feedback control to cause the mobile object 10 to move to pick up the target object P.

Processing Flow for Detecting Position and Attitude of Target Object

Figure 13:
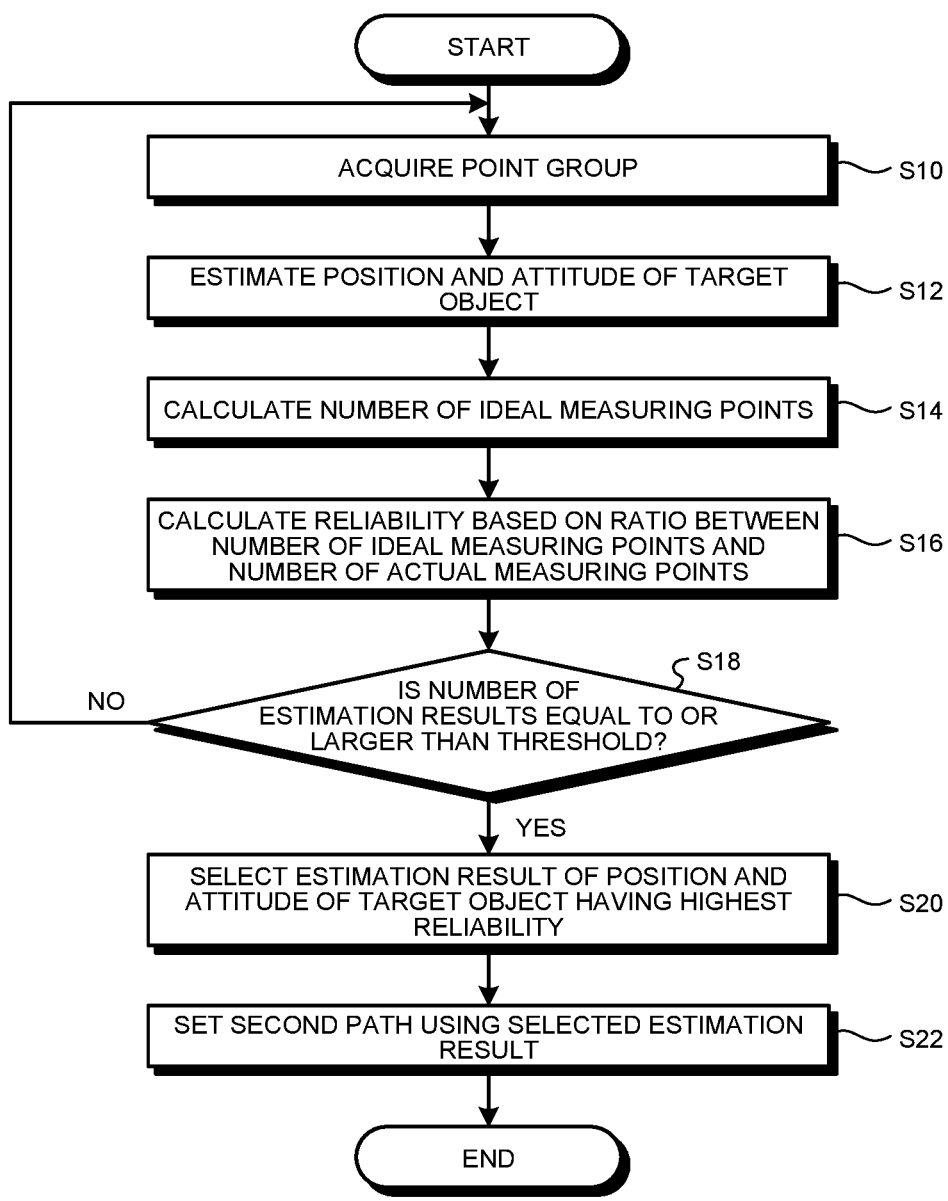
FIG. 13 is a flowchart for explaining a processing flow for setting the second path.

Next, the following describes a processing flow for setting the second path described above. FIG. 13 is a flowchart for explaining the processing flow for setting the second path. The detection control unit 74 of the control device 28 causes the sensor 26 to detect the target object P multiple times while the mobile object 10 is moving from the first position A1 to the second position A2 along the first path R1. That is, in the present embodiment, the sensor 26 is caused to detect the target object P while being moved along the first path R1. As illustrated in FIG. 13, the detection control unit 74 acquires the point group M0 (measuring points M) from one detection result obtained by the sensor 26 (Step S10). The target object information acquisition unit 76 of the control device 28 then estimates the position and the attitude of the target object P based on the point group M0 (Step S12). The reliability information acquisition unit 78 of the control device 28 then calculates the number of the ideal measuring points M in the detection based on the estimation result of the position and the attitude of the target object P, the position of the mobile object 10 at the time of performing detection, and the performance of the sensor 26 that has performed the detection (Step S14), and calculates the reliability of the estimation result of the position and the attitude of the target object P in the detection based on a ratio between the number of the ideal measuring points M and the number of the actual measuring points M (Step S16).

The control device 28 then determines whether the number of calculated estimation results is equal to or larger than a threshold. If it is not determined that the number is equal to or larger than the threshold (No at Step S18), that is, if it is determined that the number of the estimation results is smaller than the threshold, the process returns to Step S10, and the estimation result and the reliability are repeatedly calculated by acquiring the point group M0 of other detection results (detection results from other scanning) obtained by the sensor 26. The threshold herein may be optionally set. If the number of the calculated estimation results is equal to or larger than the threshold (Yes at Step S18), the selected information acquisition unit 80 of the control device 28 selects, as the estimation result used for setting of the second path R2, the estimation result having the highest reliability from among the calculated estimation results (Step S20). The second path information acquisition unit 82 of the control device 28 then sets the second path R2 using the selected estimation result (Step S22).

In the present embodiment, the position and the attitude of the target object P are estimated and the reliability is calculated every time the sensor 26 performs one detection process. For example, when the mobile object 10 arrives at the second position A2 and starts to set the second path R2, the estimation result to be used is selected based on the reliability. However, a timing for performing each piece of processing is not limited thereto, but may be optional. For example, estimation of the position and the attitude of the target object P and calculation of the reliability may be collectively performed after the sensor 26 performs an optional number of detection processes. Furthermore, when the mobile object 10 arrives at the second position A2 and starts to set the second path R2, estimation of the position and the attitude of the target object P, calculation of the reliability, and selection of the estimation result may be performed based on the previous detection results.

Effects

As described above, in the present embodiment, the control device 28 calculates the reliability of the position and the attitude of the target object P estimated for each detection process performed by the sensor 26. Thus, for example, it is possible to select the estimation result used for setting of the second path R2 based on the reliability, and set the second path R2 having high accuracy for enabling appropriate approach to the target position. Thus, according to the present embodiment, the mobile object 10 can be appropriately moved to the target position. Furthermore, the control device 28 calculates the reliability based on the ratio between the number of the ideal measuring points M calculated from the estimation result and the number of the actual measuring points M, determines that accuracy in the estimation result is higher as the number of the actual measuring points M is closer to the number of the ideal measuring points M, and increases the reliability. By calculating the reliability as described above, the estimation result having high accuracy can be selected, and the second path R2 having high accuracy can be set.

In the present embodiment, the control device 28 of the mobile object 10 estimates the position and the attitude of the target object P from the point group M0, calculates the reliability of the estimation result, selects the estimation result used for setting of the second path R2 based on the reliability, and sets the second path R2 based on the selected estimation result. However, these pieces of processing are not necessarily performed by the mobile object 10. For example, another device such as the information processing device 14 may perform at least part of the pieces of processing, and the mobile object 10 may acquire a result thereof. That is, for example, the target object information acquisition unit 76 of the mobile object 10 may acquire the estimation result of the position and the attitude of the target object P, may estimate the position and the attitude of the target object P by itself, or may acquire the estimation result of the position and the attitude of the target object P from an external device. For example, the reliability information acquisition unit 78 of the mobile object 10 may acquire information about the reliability of the estimation result, may calculate the reliability by itself, or may acquire the information about the reliability of the estimation result from an external device. In a case in which the reliability information acquisition unit 78 acquires the information about the reliability from an external device, the mobile object 10 is not required to perform an arithmetic operation using the estimation result, so that the mobile object 10 is not required to acquire the estimation result. For example, the selected information acquisition unit 80 of the mobile object 10 may acquire information about the estimation result that is selected based on the reliability, may select the estimation result by itself, or may acquire the information about the selected estimation result from an external device. In a case in which the selected information acquisition unit 80 acquires the information about the selected estimation result from an external device, the mobile object 10 is not required to perform selection processing using the reliability, so that the mobile object 10 is not required to acquire the reliability. For example, the second path information acquisition unit 82 of the mobile object 10 may acquire the information about the second path R2 that is set based on the estimation result, may set the second path R2 based on the selected estimation result by itself, or may acquire the information about the second path R2 from an external device. In a case in which the second path information acquisition unit 82 acquires the information about the second path R2 from an external device, the mobile object 10 is not required to perform an arithmetic operation using the selected estimation result, so that the mobile object 10 is not required to acquire the information about the selected estimation result.

Second Embodiment

Next, the following describes the second embodiment. In the second embodiment, the reference position AR1 used for calculating the number of the ideal measuring points M is different from that in the first embodiment. In the second embodiment, the same configurations as those in the first embodiment will not be described again.

Figure 14:
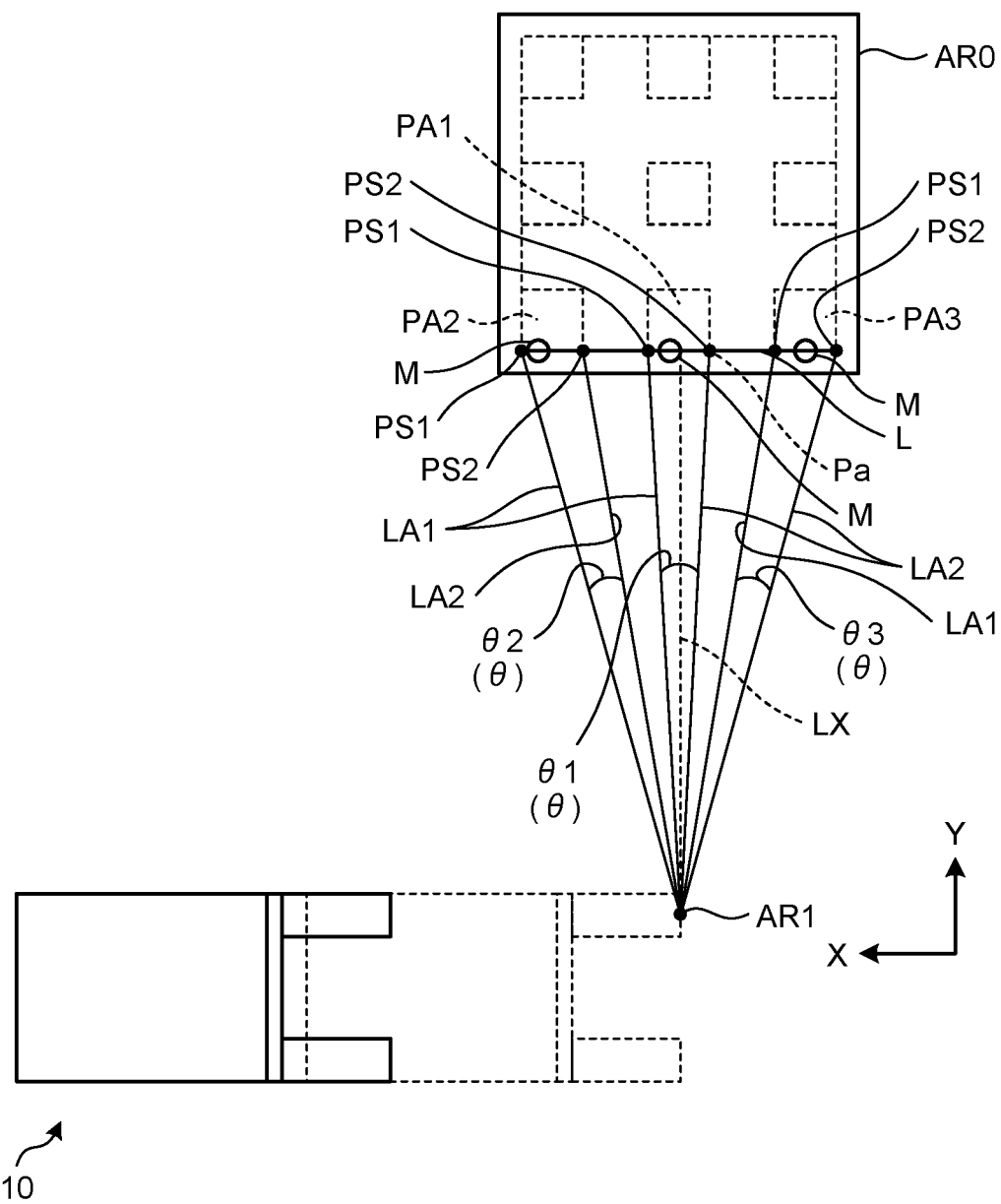
FIG. 14 is a schematic diagram for explaining a method of calculating the number of ideal measuring points in a second embodiment.

FIG. 14 is a schematic diagram for explaining a method of calculating the number of the ideal measuring points in the second embodiment. As illustrated in FIG. 14, in the second embodiment, the reliability information acquisition unit 78 sets, as the reference position AR1, a position different from the position of the mobile object 10 at the time of performing detection. The reliability information acquisition unit 78 sets the reference position AR1 based on the estimation result of the position and the attitude of the target object P and the position of the mobile object 10 at the time of performing detection. The reliability information acquisition unit 78 calculates, as the reference position AR1, a position at which the mobile object 10 has a predetermined position and attitude with respect to the estimated position and attitude of the target object P (herein, the approximate line L). Specifically, the reliability information acquisition unit 78 calculates the reference position AR1 such that a length of a straight line LX connecting the reference position AR1 with a reference point of the approximate line L is equal to a length from the position of the mobile object 10 at the time of performing detection to the reference point of the approximate line L, and an angle formed by the straight line LX and a normal line of the approximate line L falls within a predetermined range. It can be said that the reference point on the approximate line L herein is an estimated position of the target object P specified from the estimation result of the position and the attitude of the target object P. The reference point on the approximate line L may be an optional position, for example, a middle point of the approximate line L. The angle formed by the straight line LX and the normal line of the approximate line L is preferably small. For example, the reference position AR1 is preferably set such that the angle formed by the straight line LX and the normal line of the approximate line L is smaller than an angle formed by the normal line of the approximate line L and a straight line connecting the position of the mobile object 10 at the time of performing detection with the reference point of the approximate line L. Furthermore, the reference position AR1 is preferably set such that the angle formed by the straight line LX and the normal line of the approximate line L is equal to or larger than 0 degrees and equal to or smaller than a predetermined angle (for example, 5 degrees). That is, the reliability information acquisition unit 78 preferably sets, as the reference position AR1, a position at which an incidence angle of the laser light LT becomes small, such as 0°.

In the second embodiment, as described above, the position at which the incidence angle of the laser light LT becomes small is set as the reference position AR1. Succeeding calculation processing for the number of the ideal measuring points M is the same as that in the first embodiment, and thus the description thereof will not be repeated. In a case in which the incidence angle of the laser light LT from the reference position AR1 is large, the detection angle θ (an angle range of the laser light LT emitted to the target object P) becomes small, so that the number of the ideal measuring points M to be calculated becomes small. The number of the ideal measuring points M is used as a denominator in calculating the reliability. Thus, when the number of the ideal measuring points M to be calculated becomes small, the denominator becomes small, the reliability varies, and calculation accuracy for the reliability may be lowered. In contrast, in the second embodiment, the reference position AR1 is set such that the angle formed by the straight line LX and the normal line of the approximate line L becomes small. Thus, the denominator for calculating the reliability can be prevented from being a small value, and the calculation accuracy for the reliability can be prevented from being lowered.

Another Example of Calculation of Reliability

The first embodiment and the second embodiment are the same in that the reliability is calculated based on the ratio between the number of the ideal measuring points M and the number of the actual measuring points M. However, the reliability is not necessarily calculated based on the ratio between the number of the ideal measuring points M and the number of the actual measuring points M, but may be calculated by an optional method using the estimation result. The following describes other examples of the calculation method for the reliability.

For example, the reliability information acquisition unit 78 may calculate the reliability based on a residual of the approximate line L. The residual indicates a distance between the measuring point M and the approximate line L. The reliability information acquisition unit 78 preferably sets the reliability to be higher as the residual of the approximate line L is smaller. For example, the reliability information acquisition unit 78 may calculate, as the residual, the distance between the measuring point M and the approximate line L in the two-dimensional coordinate system CO for each of the measuring points M, and may set the reliability to be higher as a total value of calculated residuals is smaller. For example, the reliability information acquisition unit 78 may calculate a ratio of the total value of the residuals to a total value of the measuring points M as the reliability of the estimation result.

For example, the reliability information acquisition unit 78 may remove part of the measuring points M used for calculating the approximate line L, and may calculate the reliability of the estimation result based on a difference between the approximate line L and an approximate line L' that is calculated by performing straight line fitting on the rest of the measuring points M. For example, the reliability information acquisition unit 78 may calculate the reliability of the estimation result based on the shortest distance between the approximate line L' and the approximate line L. In this case, for example, the reliability information acquisition unit 78 increases the reliability as the shortest distance between the approximate line L' and the approximate line L is shorter. For example, the reliability information acquisition unit 78 may also calculate the reliability based on a difference between an X-coordinate of the approximate line L' and an X-coordinate of the approximate line L, a difference between a Y-coordinate of the approximate line L' and a Y-coordinate of the approximate line L, and a difference between an attitude (angle) of the approximate line L' and an attitude (angle) of the approximate line L. In this case, the reliability information acquisition unit 78 increases the reliability as each of the differences is smaller.

For example, the reliability information acquisition unit 78 may also calculate the reliability of the estimation result based on a positional relation between the mobile object 10 at the time of performing detection and the target object P (approximate line L). In this case, for example, the reliability information acquisition unit 78 increases the reliability as a distance between the mobile object 10 at the time of performing detection and the target object P (approximate line L) is shorter. For example, the reliability information acquisition unit 78 increases the reliability as an angle of a straight line connecting the mobile object 10 at the time of performing detection with the target object P (approximate line L) with respect to a perpendicular of the approximate line L is smaller.

For example, the reliability information acquisition unit 78 may calculate the reliability of the estimation result based on an inclination angle of a position of the mobile object 10 on the floor (that is, a point at which the mobile object 10 is positioned in the region AR) with respect to the horizontal direction. In this case, for example, the reliability information acquisition unit 78 acquires information about the inclination angle of the point at which the mobile object 10 at the time of performing detection is positioned with respect to the horizontal direction, and calculates the reliability based on the inclination angle. The reliability information acquisition unit 78 increases the reliability as the inclination angle is smaller. The information about the inclination angle may be acquired by an optional method. For example, a sensor for detecting the inclination angle is mounted on the mobile object 10, and a detection result of the sensor may be acquired.

Third Embodiment

Next, the following describes a third embodiment. The third embodiment is different from the first embodiment in the calculation method for the reliability in a case of causing the sensors 26 to perform detection at the same timing. In the third embodiment, the same configurations as those in the first embodiment will not be described again. The third embodiment can also be applied to the second embodiment.

Estimation of Position and Attitude of Target Object

In the third embodiment, the detection control unit 74 causes the sensors 26 to perform detection at the same timing, that is, at a timing when the mobile object 10 is present at the same position, and acquires detection results of the respective sensors 26 as the point group M0 (measuring points M). The target object information acquisition unit 76 then superimposes the measuring points M acquired by detection at the same timing by the sensors 26 in the same coordinate system (in the example of the present embodiment, the two-dimensional coordinate system CO). That is, the target object information acquisition unit 76 plots the measuring points M acquired by detection at the same timing by the respective sensors 26 on the same two-dimensional coordinate system CO. The coordinate system in which the measuring points M are superimposed is not limited to the two-dimensional coordinate system CO, but may be a three-dimensional coordinate system, for example.

The target object information acquisition unit 76 estimates the position and the attitude of the target object P by the same method as that in the first embodiment using the superimposed measuring points M. In the third embodiment, the sensors 26 are caused to perform detection every time the mobile object 10 moves, and the position and the attitude of the target object P are estimated every time the mobile object 10 moves. In the third embodiment, the detection results of the sensors 26 are superimposed, so that the number of the measuring points M used for estimating the position and the attitude of the target object P can be increased, and estimation accuracy can be improved.

Calculation of Reliability

In the third embodiment, individual reliability is calculated for each of the sensors 26, and the reliability of the estimation result of the position and the attitude of the target object P is calculated based on the individual reliability. The following exemplifies a case of causing a first sensor and a second sensor to perform detection at the same timing. In this case, the target object information acquisition unit 76 superimposes first measuring points (first point group) that are the measuring points M (point group M0) acquired by detection performed by the first sensor on second measuring points (second point group) that are the measuring points M (point group M0) acquired by detection performed by the second sensor in the two-dimensional coordinate system CO. The target object information acquisition unit 76 then estimates the position and the attitude of the target object P based on the superimposed first measuring points and second measuring points. The reliability information acquisition unit 78 then calculates first individual reliability that is the reliability of detection results (first measuring points) obtained by the first sensor and second individual reliability that is the reliability of detection results (second measuring points) obtained by the second sensor. The reliability information acquisition unit 78 calculates the reliability of the estimation result that is calculated based on the superimposed first measuring points and second measuring points based on the first individual reliability and the second individual reliability. The calculation method for the first individual reliability and the second individual reliability may be the same as the calculation method for the reliability described in the first embodiment, the second embodiment, or the other examples.

More specifically, the reliability information acquisition unit 78 calculates the reliability of the estimation result based on the individual reliability and a distance from each of the sensors 26 to the estimated position of the target object P (for example, the reference point on the approximate line L). That is, the reliability information acquisition unit 78 calculates the reliability based on the first individual reliability, a distance from a position of the first sensor at the time of detection to the estimated position of the target object P, the second individual reliability, and a distance from a position of the second sensor at the time of detection to the estimated position of the target object P. Specifically, the reliability information acquisition unit 78 assigns a weight to the individual reliability in accordance with the distance from each of the sensors to the estimated position of the target object P, and averages pieces of the weighted individual reliability to calculate the reliability. The reliability information acquisition unit 78 increases the weight as the distance from the sensor 26 to the estimated position of the target object P is shorter. For example, the reliability information acquisition unit 78 calculates a first weight for the first individual reliability based on the distance from the position of the first sensor at the time of performing detection to the estimated position of the target object P, and calculates a second weight for the second individual reliability based on the distance from the position of the second sensor at the time of performing detection to the estimated position of the target object P. The reliability information acquisition unit 78 then calculates the reliability of the estimation result by dividing, by the number of pieces of individual reliability, a total value of a value obtained by multiplying the first individual reliability by the first weight and a value obtained by multiplying the second individual reliability by the second weight.

The calculation method for the reliability using two sensors is exemplified above, but also in a case of using three or more sensors, the reliability may be calculated by a similar method. That is, for example, the reliability information acquisition unit 78 calculates reliability S of the estimation result using the following Equation (2). In Equation (2), n is the number of sensors, v is individual reliability, and s is a weight.

$$S = (v1 \cdot s1 + v2 \cdot s2 + \ldots vn \cdot sn)/n \tag{2}$$

In this way, by calculating the reliability while increasing the weight as the distance from the sensor to the estimated position of the target object P is shorter, a detection result having a short distance and high accuracy can be more preferably reflected in the reliability, so that the estimation result having high accuracy can be appropriately selected based on the reliability. However, the calculation method for the reliability according to the third embodiment is not limited thereto. The reliability may be calculated by an optional method based on the individual reliability for each of the sensors 26.

Also in the first embodiment, the sensors 26 may be caused to perform detection at the same timing. However, in a case of the first embodiment, the measuring points M that are detected by the respective sensors 26 at the same timing are not superimposed as in the second embodiment, and the estimation result is individually calculated every time each of the sensors 26 performs detection.

Fourth Embodiment

Next, the following describes a fourth embodiment. The fourth embodiment is different from the first embodiment in a method of selecting the estimation result used for setting the second path R2. In the fourth embodiment, the same configurations as those in the first embodiment will not be described again. The fourth embodiment can also be applied to the second embodiment and the third embodiment.

In the fourth embodiment, the selected information acquisition unit 80 selects the estimation result used for setting of the second path R2 based not only on the reliability but also on a detection distance that is a distance from the position of the mobile object 10 at the time of detection to the estimated position of the target object P. For example, the selected information acquisition unit 80 selects, as the estimation result used for setting of the second path R2, an estimation result the reliability of which is equal to or larger than a threshold and the detection distance of which is the shortest from among the estimation results. By way of example, the following describes a case in which a first estimation result is calculated from the measuring points M acquired by the first detection process performed by the sensor 26, a second estimation result is calculated from the measuring points M acquired by the second detection process performed by the sensor 26, and respective pieces of reliability of the first estimation result and the second estimation result are equal to or larger than the threshold. In this example, in a case in which a first detection distance from the position of the mobile object 10 to the estimated position of the target object P in the first detection process is shorter than a second detection distance from the position of the mobile object 10 to the estimated position of the target object P in the second detection process, the first estimation result is selected as the estimation result used for setting of the second path R2.

In the fourth embodiment, it is preferable to select the estimation result again based on the reliability and the detection distance as described above to update the second path R2 after the second path R2 is generated. That is, in this case, when the mobile object 10 arrives at the second position A2, the selected information acquisition unit 80 selects the estimation result used for setting of the second path R2 from among the estimation results of the position and the attitude of the target object P calculated from the detection results of the sensor 26 during movement along the first path R1. The second path information acquisition unit 82 then generates the second path R2 using the selected estimation result, and the mobile object 10 starts to move along the second path R2. The estimation result used for the first setting of the second path R2 may be selected based on the reliability as in the first embodiment, or may be selected based on the reliability and the detection distance as described above.

The detection control unit 74 then causes the sensor 26 to perform detection even while the mobile object 10 is moving along the second path R2. The target object information acquisition unit 76 estimates the position and the attitude of the target object P based on the measuring points M acquired by detection performed by the sensor 26 on the second path R2, and the reliability information acquisition unit 78 calculates the reliability of the estimation result and the detection distance at the time when detection is performed on the second path R2. The selected information acquisition unit 80 then selects the estimation result used for updating the second path R2 from the estimation result calculated by detection performed by the sensor 26 on the first path R1 and the estimation result calculated by detection performed by the sensor 26 on the second path R2 based on the reliability and the detection distance. In this case, as described above, the selected information acquisition unit 80 selects, as the estimation result used for updating the second path R2, the estimation result the reliability of which is equal to or larger than the threshold and the detection distance of which is the shortest from among the estimation results. In a case in which the estimation result selected for update is different from the estimation result selected for setting the second path R2 at the present point, the second path information acquisition unit 82 updates the second path R2 using the estimation result selected for update. The mobile object 10 continuously moves while switching the path to the updated second path R2. The detection control unit 74 may repeat update processing for the second path R2.

In this way, in the fourth embodiment, it is possible to make an approach to reduce misalignment with the target object P by continuously performing detection even while the mobile object 10 is moving along the second path R2 to update the second path R2. Furthermore, detection accuracy of the sensor 26 tends to be higher as the detection distance is shorter, so that it is possible to reduce misalignment with the target object P by making a switch to the estimation result having a short detection distance to update the second path R2. However, in this case, if the estimation result having a short detection distance is simply selected, there is a possibility of selecting the estimation result having the short detection distance and the reliability that is suddenly lowered, and misalignment with the target object P may be caused. In contrast, in the fourth embodiment, the reliability is filtered by the threshold, so that an appropriate approach can be made to the target object P by using the estimation result the reliability of which is high to some degree.

Effects of Present Disclosure

As described above, the control method according to the present disclosure is for the mobile object 10 that automatically moves, and includes: a step of causing the sensor 26 disposed on the mobile object 10 to detect the target object P to acquire the detection results of the sensor 26 as the point group M0; a step of estimating the position and the attitude of the target object P based on the point group M0; a step of calculating the number of ideal point groups assumed to be acquired by detection performed by the sensor 26 based on the estimation result of the position and the attitude of the target object P, the position of the mobile object 10 at the time of performing detection, and the performance of the sensor 26; and a step of calculating the reliability of accuracy in the estimation result of the position and the attitude of the target object P based on the comparison result between the number of ideal point groups and the number of point groups that are actually acquired. With this control method, accuracy in the estimation result can be appropriately grasped by calculating the reliability based on the comparison result between the number of ideal point groups and the number of actual point groups. Accordingly, for example, the estimation result used for setting of the second path R2 can be selected based on the reliability, and the mobile object 10 can be appropriately moved to the target position.

The sensor 26 detects the target object P by emitting light while performing scanning in a predetermined direction. In the control method according to the present disclosure, at the step of calculating the number of ideal point groups, in a case in which the sensor 26 emits light from the reference position AR1 corresponding to the position of the mobile object 10 at the time of performing detection, the detection angle θ that is an angle range in which light is emitted to the target object P is calculated from among scan angles for performing scanning with light in one detection process performed by the sensor 26, and the number of ideal point groups is calculated based on the ratio between the detection angle θ and the angular resolution of the sensor 26. With this control method, the number of point groups in a case of being detected under an appropriate condition can be calculated as the number of ideal point groups, so that whether actual detection is appropriately performed by the sensor 26 can be reflected in the reliability. Thus, by using the reliability calculated as described above, accuracy in the estimation result can be appropriately grasped.

At the step of calculating the number of ideal point groups, the position of the mobile object 10 at the time of performing detection is assumed to be the reference position AR1. With this control method, by calculating the number of ideal point groups assuming that the position of the mobile object 10 at the time of performing detection is the reference position AR1, the reliability can be appropriately calculated, and accuracy in the estimation result can be appropriately grasped.

At the step of calculating the number of ideal point groups, the reference position AR1 is set such that the distance from the reference position AR1 to the estimated position of the target object P is equal to the distance from the position of the mobile object 10 at the time of performing detection to the estimated position of the target object P, and the angle formed by the straight line connecting the reference position AR1 with the target object P and the normal line of the estimated front surface Pa (approximate line L) of the target object P falls within the predetermined range. With this control method, by setting the reference position AR1 as described above, the number of ideal point groups can be prevented from being reduced, and calculation accuracy for the reliability can be prevented from being lowered.

In the target object P, the pillars PA and the openings PB among the pillars PA are formed. In the control method according to the present disclosure, at the step of calculating the number of ideal point groups, the position of the endpoint PS1 on one side and the position of the endpoint PS2 on the other side in the width direction of the pillar PA are specified for each of the pillars PA based on the estimation result of the position and the attitude of the target object P. The angle formed by the straight line LA1 connecting the reference position AR1 with the endpoint PS1 and the straight line LA2 connecting the reference position AR1 with the endpoint PS2 is calculated as the detection angle θ for each of the pillars PA, and the number of ideal point groups for each of the pillars PA is calculated based on the ratio between the detection angle θ and the angular resolution of the sensor 26. At the step of calculating the reliability, the reliability for each of the pillars PA is calculated based on the ratio between the number of ideal point groups for each of the pillars PA and the number of point groups that are actually acquired for each of the pillars PA, and the reliability of the estimation result of the position and the attitude of the target object P is calculated based on the reliability for each of the pillars PA. With this control method, by calculating the reliability for each of the pillars PA as described above, the reliability can be appropriately calculated, and accuracy in the estimation result can be appropriately grasped.

At the step of calculating the number of ideal point groups, the position of the endpoint PS1 on one side and the position of the endpoint PS2 on the other side in the width direction of the pillar PA are specified. The angle formed by the straight line LA1 connecting the reference position AR1 with the endpoint PS1 and the straight line LA2 connecting the reference position AR1 with the endpoint PS2 is calculated as the detection angle θ for each of the pillars PA, and the total value of the number of ideal point groups for each of the pillars PA is calculated based on the ratio between the total value of the detection angle θ for each of the pillars PA and the angular resolution of the sensor 26. At the step of calculating the reliability, the reliability is calculated based on the ratio between the total value of the number of ideal point groups and the number of point groups that are actually acquired. With this control method, the reliability is collectively calculated for the respective pillars PA, so that a calculation load can be reduced.

At the step of acquiring the detection results of the sensor 26 as the point group, the first sensor and the second sensor are caused to detect the target object P, and the first point group corresponding to the detection results of the first sensor and the second point group corresponding to the detection results of the second sensor are acquired. At the step of estimating the position and the attitude of the target object P, the first point group and the second point group are superimposed in the same coordinate system, and the position and the attitude of the target object P are estimated based on the superimposed first point group and second point group. At the step of calculating the reliability, the first individual reliability that is the reliability of the first point group and the second individual reliability that is the reliability of the second point group are calculated, and the reliability is calculated based on the first individual reliability, the distance from the position of the first sensor at the time of performing detection to the estimated position of the target object P, the second individual reliability, and the distance from the position of the second sensor at the time of performing detection to the estimated position of the target object P. With this control method, estimation accuracy can be improved by increasing the number of point groups used for estimating the position and the attitude of the target object P. Additionally, the reliability is calculated by using the individual reliability for each sensor and the distance from the sensor to the estimated position of the target object P, so that the reliability can be appropriately calculated, and accuracy in the estimation result can be appropriately grasped.

The mobile object 10 according to the present disclosure automatically moves, and includes: the detection control unit 74 that causes the sensor 26 disposed on the mobile object 10 to detect the target object P to acquire the detection results of the sensor 26 as the point group M0; and the reliability information acquisition unit 78 that acquires the information about the reliability of accuracy in the estimation result of the position and the attitude of the target object P that is estimated based on the point group M0. The reliability is calculated based on the comparison result between the number of ideal point groups and the number of point groups that are actually acquired when the position and the attitude of the target object P are estimated based on the point group M0, and the number of ideal point groups assumed to be acquired by detection performed by the sensor 26 is calculated based on the estimation result of the position and the attitude of the target object P, the position of the mobile object 10 at the time of performing detection, and the performance of the sensor 26. The mobile object 10 can appropriately move to the target position by using the reliability calculated as described above.

The computer program according to the present disclosure causes a computer to perform the control method for the mobile object 10 that automatically moves, and causes the computer to perform: a step of causing the sensor 26 disposed on the mobile object 10 to detect the target object P to acquire the detection results of the sensor 26 as the point group M0; a step of estimating the position and the attitude of the target object P based on the point group M0; a step of calculating the number of ideal point groups assumed to be acquired by detection performed by the sensor 26 based on the estimation result of the position and the attitude of the target object P, the position of the mobile object 10 at the time of performing detection, and the performance of the sensor 26; and a step of calculating the reliability of accuracy in the estimation result of the position and the attitude of the target object P based on the comparison result between the number of ideal point groups and the number of point groups that are actually acquired. With this computer program, the mobile object 10 can be appropriately moved to the target position.

The control method according to the present disclosure is for the mobile object 10 that automatically moves, and includes: a step of causing the sensor 26 disposed on the mobile object 10 to detect the target object P multiple times to acquire the detection results of each detection process performed by the sensor 26 as the point group M0; a step of estimating the position and the attitude of the target object P for each detection process performed by the sensor 26 based on the point group M0; a step of calculating the reliability of accuracy in the estimation result of the position and the attitude of the target object P for each detection process performed by the sensor 26; a step of selecting the estimation result used for setting the second path R2 (approach path) to the target position at which the predetermined position and attitude with respect to the target object P are achieved from the estimation results of respective detection processes performed by the sensor 26 based on the reliability of each detection process performed by the sensor 26; a step of setting the second path R2 based on the selected estimation result; and a step of causing the mobile object 10 to move along the second path R2. With this control method, the reliability for each estimation result is calculated, and the estimation result used for setting of the second path R2 is selected based on the reliability, so that the mobile object 10 can be appropriately moved to the target position using the estimation result having high accuracy.

At the step of estimating the position and the attitude of the target object P, the position and the attitude of the target object P are estimated based on the second point group corresponding to the second detection process performed by the sensor 26 while the position and the attitude of the target object P are estimated based on the first point group that is the point group corresponding to the first detection process performed by the sensor 26. At the step of calculating the reliability, the reliability of the estimation result based on the first point group and the reliability that is the reliability of the estimation result based on the second point group are calculated, and at the step of selecting the estimation result, the estimation result having higher reliability is selected from the estimation result based on the first point group and the estimation result based on the second point group. With this control method, the mobile object 10 can be appropriately moved to the target position by using the estimation result having high accuracy.

At the step of selecting the estimation result, the estimation result having the highest reliability is selected from among the estimation results obtained by the respective detection processes performed by the sensor 26. With this control method, the mobile object 10 can be appropriately moved to the target position by using the estimation result having high accuracy.

At the step of selecting the estimation result, the estimation result is selected also based on the detection distance from the position of the mobile object 10 at the time of performing detection to the estimated position of the target object P. With this control method, the estimation result used for setting of the second path R2 is selected by also using the detection distance, so that the estimation result having higher accuracy can be selected, and the mobile object 10 can be appropriately moved to the target position.

At the step of selecting the estimation result, the estimation result the reliability of which is equal to or larger than the threshold and the detection distance of which is the shortest is selected. With this control method, the estimation result having higher accuracy can be selected, and the mobile object 10 can be appropriately moved to the target position.

The control method according to the present disclosure further includes: a step of acquiring information about a wide area path (first path R1) traversing the disposition region AR0 in which the target object P is disposed, and a step of causing the mobile object 10 to move along the first path R1. At the step of acquiring the point group M0, the sensor 26 is caused to detect the target object P multiple times while the mobile object 10 is moving along the first path R1. With this control method, by causing the sensor 26 to perform detection multiple times while the mobile object 10 is moving and traversing the target object P, the target object P can be appropriately detected, and detection accuracy for the target object P can be preferably prevented from being lowered.

The mobile object 10 according to the present disclosure automatically moves, and includes: the detection control unit 74 that causes the sensor 26 disposed on the mobile object 10 to detect the target object P multiple times to acquire the detection results of the respective detection processes performed by the sensor 26 as the point group M0; the second path information acquisition unit 82 (approach path information acquisition unit) that acquires the information about the second path R2 to the target position at which the predetermined position and attitude with respect to the target object P that are set based on the point group M0 are achieved; and the movement control unit 72 that causes the mobile object 10 to move along the second path R2. The second path R2 is set based on the estimation result selected by estimating the position and the attitude of the target object P for each detection process performed by the sensor 26 based on the point group M0, calculating the reliability of accuracy in the estimation result of the position and the attitude of the target object P for each detection process performed by the sensor 26, and selecting the estimation result used for setting the second path R2 from among the estimation results of the respective detection processes performed by the sensor 26 based on the reliability of each detection process performed by the sensor 26. The mobile object 10 moves along the second path R2 set from estimation information that is selected based on the reliability, so that the mobile object 10 can appropriately move to the target position.

The computer program according to the present disclosure causes a computer to perform the control method for the mobile object 10 that automatically moves, and causes the computer to perform: a step of causing the sensor 26 disposed on the mobile object 10 to detect the target object P multiple times to acquire the detection result of each detection process performed by the sensor 26 as the point group M0; a step of estimating the position and the attitude of the target object P for each detection process performed by the sensor 26 based on the point group M0; a step of calculating the reliability of accuracy in the estimation result of the position and the attitude of the target object P for each detection process performed by the sensor 26; a step of selecting the estimation result used for setting the second path R2 (approach path) to the target position at which the predetermined position and attitude with respect to the target object P are achieved from among the estimation results of the respective detection processes performed by the sensor 26 based on the reliability of each detection process performed by the sensor 26; a step of setting the second path R2 based on the selected estimation result; and a step of causing the mobile object 10 to move along the second path R2. With this computer program, the mobile object 10 can be caused to appropriately move to the target position using the estimation result having high accuracy.

The embodiments of the present invention have been described above, but the embodiments are not limited thereto. The constituent elements described above encompass a constituent element that is easily conceivable by those skilled in the art, substantially the same constituent element, and what is called an equivalent. The constituent elements described above can be appropriately combined with each other. Furthermore, the constituent elements can be variously omitted, substituted, or modified without departing from the gist of the embodiments described above.

REFERENCE SIGNS LIST

10 Mobile object
26 Sensor
70 First path information acquisition unit
72 Movement control unit
74 Detection control unit
76 Target object information acquisition unit
78 Reliability information acquisition unit
80 Selected information acquisition unit
82 Second path information acquisition unit
M Measuring point
M0 Point group
P Target object
R2 Second path

The invention claimed is:

1. A control method for a mobile object that automatically moves, the control method comprising:
    causing a sensor disposed on the mobile object to detect a target object multiple times to acquire detection results of respective detection processes performed by the sensor as a point group;
    estimating a position and an attitude of the target object for each detection process performed by the sensor based on the point group;
    calculating reliability of accuracy in an estimation result of the position and the attitude of the target object for each detection process performed by the sensor;
    selecting, from among estimation results of the respective detection processes performed by the sensor, an estimation result used for setting an approach path to a target position at which a predetermined position and attitude with respect to the target object are achieved, based on the reliability for each detection process performed by the sensor;
    setting the approach path based on the selected estimation result; and
    causing the mobile object to move along the approach path;
    estimating the position and the attitude of the target object includes:
    acquiring a plurality of straight lines connecting two points randomly selected from the acquired point group as a plurality of candidate for approximate line;
    calculating a score integrated value that is an integrated value of scores determined by a vertical distance from each point of the point group for each of the plurality of candidate for approximate line;
    selecting an approximate line from the plurality of candidate for approximate line based on the score integrated value; and
    estimating the position and the attitude of the target object based on the selected approximate line;
    wherein the reliability of accuracy is calculated based on the ratio between an ideal number of measurement points that are assumed to be obtained in one detection by the sensor and an actual number of measurement points obtained in one detection by the sensor.

2. The control method for the mobile object according to claim 1, wherein
    estimating the position and the attitude of the target object includes estimating the position and the attitude of the target object based on a first point group that is a point group acquired from first detection processes performed by the sensor, and estimating the position and the attitude of the target object based on a second point group acquired from second detection processes performed by the sensor,
    calculating the reliability includes calculating reliability of an estimation result based on the first point group and reliability of an estimation result based on the second point group, and
    selecting the estimation result includes selecting an estimation result having higher reliability from the estimation result based on the first point group and the estimation result based on the second point group.

3. The control method for the mobile object according to claim 2, wherein selecting the estimation result includes selecting an estimation result having the highest reliability from among the estimation results of respective detection processes performed by the sensor.

4. The control method for the mobile object according to claim 1, wherein selecting the estimation result includes selecting the estimation result also based on a distance from a position of the mobile object at the time of performing detection to an estimated position of the target object.

5. The control method for the mobile object according to claim 4, wherein selecting the estimation result includes selecting an estimation result the reliability of which is equal to or larger than a threshold and the distance of which is the shortest.

6. The control method for the mobile object according to claim 1, further comprising:
    acquiring information about a wide area path traversing a disposition region in which the target object is disposed; and
    causing the mobile object to move along the wide area path, wherein
    causing the sensor disposed on the mobile object to detect the target object multiple times includes causing the sensor to detect the target object multiple times while the mobile object is moving along the wide area path.

7. A mobile object that automatically moves, comprising:
    a detection control unit configured to cause a sensor disposed on the mobile object to detect a target object multiple times to acquire detection results of respective detection processes performed by the sensor as a point group;
    an approach path information acquisition unit configured to acquire information about an approach path to a target position at which a predetermined position and attitude with respect to the target object are achieved, the target position being set based on the point group; and
    a movement control unit configured to cause the mobile object to move along the approach path, wherein
    the approach path is set based on an estimation result selected by
    estimating a position and an attitude of the target object for each detection process performed by the sensor based on the point group, estimating the position and the attitude of the target object includes:
    acquiring a plurality of straight lines connecting two points randomly selected from the acquired point group as a plurality of candidate for approximate line;
    calculating a score integrated value that is an integrated value of scores determined by a vertical distance from each point of the point group for each of the plurality of candidate for approximate line;
    selecting an approximate line from the plurality of candidate for approximate line based on the score integrated value; and
    estimating the position and the attitude of the target object based on the selected approximate line;
    calculating reliability of accuracy in an estimation result of the position and the attitude of the target object for each detection process performed by the sensor, and
    selecting an estimation result used for setting the approach path from among estimation results of the respective detection processes performed by the sensor based on the reliability for each detection process performed by the sensor;
    wherein the reliability of accuracy is calculated based on the ratio between an ideal number of measurement points that are assumed to be obtained in one detection by the sensor and an actual number of measurement points obtained in one detection by the sensor.

8. A non-transitory computer-readable storage medium storing a program for causing a computer to perform a control method for a mobile object that automatically moves, the program comprising:
- causing a sensor disposed on the mobile object to detect a target object multiple times to acquire detection results of respective detection processes performed by the sensor as a point group;
- estimating a position and an attitude of the target object for each detection process performed by the sensor based on the point group;
- calculating reliability of accuracy in an estimation result of the position and the attitude of the target object for each detection process performed by the sensor;
- selecting, from among estimation results of the respective detection processes performed by the sensor, an estimation result used for setting an approach path to a target position at which a predetermined position and attitude with respect to the target object are achieved based on the reliability for each detection process performed by the sensor;
- setting the approach path based on the selected estimation result; and
- causing the mobile object to move along the approach path;

estimating the position and the attitude of the target object includes:
- acquiring a plurality of straight lines connecting two points randomly selected from the acquired point group as a plurality of candidate for approximate line;
- calculating a score integrated value that is an integrated value of scores determined by a vertical distance from each point of the point group for each of the plurality of candidate for approximate line;
- selecting an approximate line from the plurality of candidate for approximate line based on the score integrated value; and
- estimating the position and the attitude of the target object based on the selected approximate line;
- wherein the reliability of accuracy is calculated based on the ratio between an ideal number of measurement points that are assumed to be obtained in one detection by the sensor and an actual number of measurement points obtained in one detection by the sensor.

* * * * *